(12) United States Patent
Konolige

(10) Patent No.: US 10,466,043 B2
(45) Date of Patent: Nov. 5, 2019

(54) IMAGER FOR DETECTING VISUAL LIGHT AND PROJECTED PATTERNS

(71) Applicant: X Development LLC, Mountain View, CA (US)

(72) Inventor: Kurt Konolige, Menlo Park, CA (US)

(73) Assignee: X Development LLC, Mountain View, CA (US)

(*) Notice: Subject to any disclaimer, the term of this patent is extended or adjusted under 35 U.S.C. 154(b) by 206 days.

(21) Appl. No.: 15/608,002

(22) Filed: May 30, 2017

(65) Prior Publication Data

US 2017/0261314 A1    Sep. 14, 2017

Related U.S. Application Data

(62) Division of application No. 14/672,369, filed on Mar. 30, 2015, now Pat. No. 9,694,498.

(51) Int. Cl.
*G06K 9/28* (2006.01)
*G06T 15/00* (2011.01)
(Continued)

(52) U.S. Cl.
CPC ......... *G01B 11/2545* (2013.01); *B25J 9/1697* (2013.01); *G01B 11/026* (2013.01); *G01B 11/24* (2013.01); *G05D 1/0242* (2013.01); *G06K 9/00201* (2013.01); *G06T 1/0014* (2013.01); *G06T 7/521* (2017.01); *G06T 7/593* (2017.01);
(Continued)

(58) Field of Classification Search
CPC . G06T 2207/10028; G06T 2207/10012; G06T 7/0075; G06T 7/0077; H04N 2013/0081; H04N 13/0239
See application file for complete search history.

(56) References Cited

U.S. PATENT DOCUMENTS 8,238,611 B2    8/2012    St. Hilaire et al.
2010/0246893 A1    9/2010    Dani et al.
(Continued)

FOREIGN PATENT DOCUMENTS

JP    H-11-337815    12/1999
JP    2001-189926 A    7/2001
(Continued)

*Primary Examiner* — Brian Werner
(74) *Attorney, Agent, or Firm* — McDonnell Boehnen Hulbert & Berghoff LLP

(57) ABSTRACT

Methods and systems for depth sensing are provided. A system includes a first and second optical sensor each including a first plurality of photodetectors configured to capture visible light interspersed with a second plurality of photodetectors configured to capture infrared light within a particular infrared band. The system also includes a computing device configured to (i) identify first corresponding features of the environment between a first visible light image captured by the first optical sensor and a second visible light image captured by the second optical sensor; (ii) identify second corresponding features of the environment between a first infrared light image captured by the first optical sensor and a second infrared light image captured by the second optical sensor; and (iii) determine a depth estimate for at least one surface in the environment based on the first corresponding features and the second corresponding features.

12 Claims, 16 Drawing Sheets

(51) Int. Cl.
*G01B 11/25* (2006.01)
*H04N 13/254* (2018.01)
*H04N 13/271* (2018.01)
*B25J 9/16* (2006.01)
*G05D 1/02* (2006.01)
*G06K 9/00* (2006.01)
*G06T 1/00* (2006.01)
*G01B 11/02* (2006.01)
*G06T 7/593* (2017.01)
*G06T 7/521* (2017.01)
*H04N 13/239* (2018.01)
*G01B 11/24* (2006.01)
*H04N 13/00* (2018.01)

(52) U.S. Cl.
CPC ......... *H04N 13/239* (2018.05); *H04N 13/254* (2018.05); *H04N 13/271* (2018.05); *G05B 2219/40425* (2013.01); *G06T 2207/10012* (2013.01); *G06T 2207/10048* (2013.01); *G06T 2207/30164* (2013.01); *H04N 2013/0081* (2013.01); *Y10S 901/09* (2013.01); *Y10S 901/47* (2013.01)

(56) References Cited

U.S. PATENT DOCUMENTS

| | | |
|---|---|---|
| 2011/0175983 A1 | 7/2011 | Park et al. |
| 2014/0028804 A1 | 1/2014 | Usuda et al. |
| 2014/0062882 A1* | 3/2014 | Ozawa .................. G06F 3/038 345/158 |
| 2014/0184751 A1 | 7/2014 | Liou et al. |
| 2014/0231625 A1 | 8/2014 | Chang et al. |
| 2014/0240492 A1 | 8/2014 | Lee |
| 2014/0340287 A1* | 11/2014 | Achilefu .............. G02B 27/017 345/8 |
| 2015/0256813 A1 | 9/2015 | Dal Mutto et al. |
| 2017/0091550 A1* | 3/2017 | Feng .................. G06K 9/00597 |

FOREIGN PATENT DOCUMENTS

| | | |
|---|---|---|
| JP | 2001-264033 A | 9/2001 |
| JP | 2013-172038 A | 9/2013 |
| JP | 2013-257162 A | 12/2013 |
| JP | 2014-009997 A | 1/2014 |
| JP | 2014-035567 A | 2/2014 |
| WO | WO 2012/137434 A1 | 7/2014 |
| WO | 2015/119872 A1 | 8/2015 |

* cited by examiner

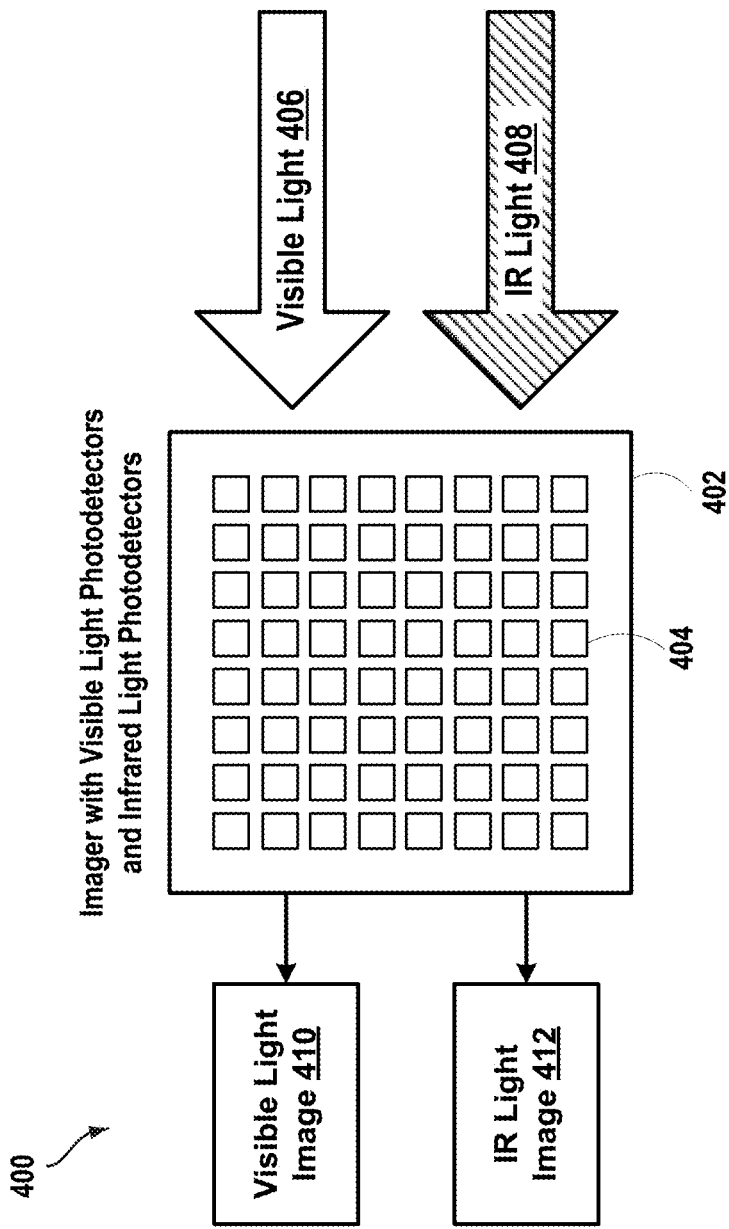

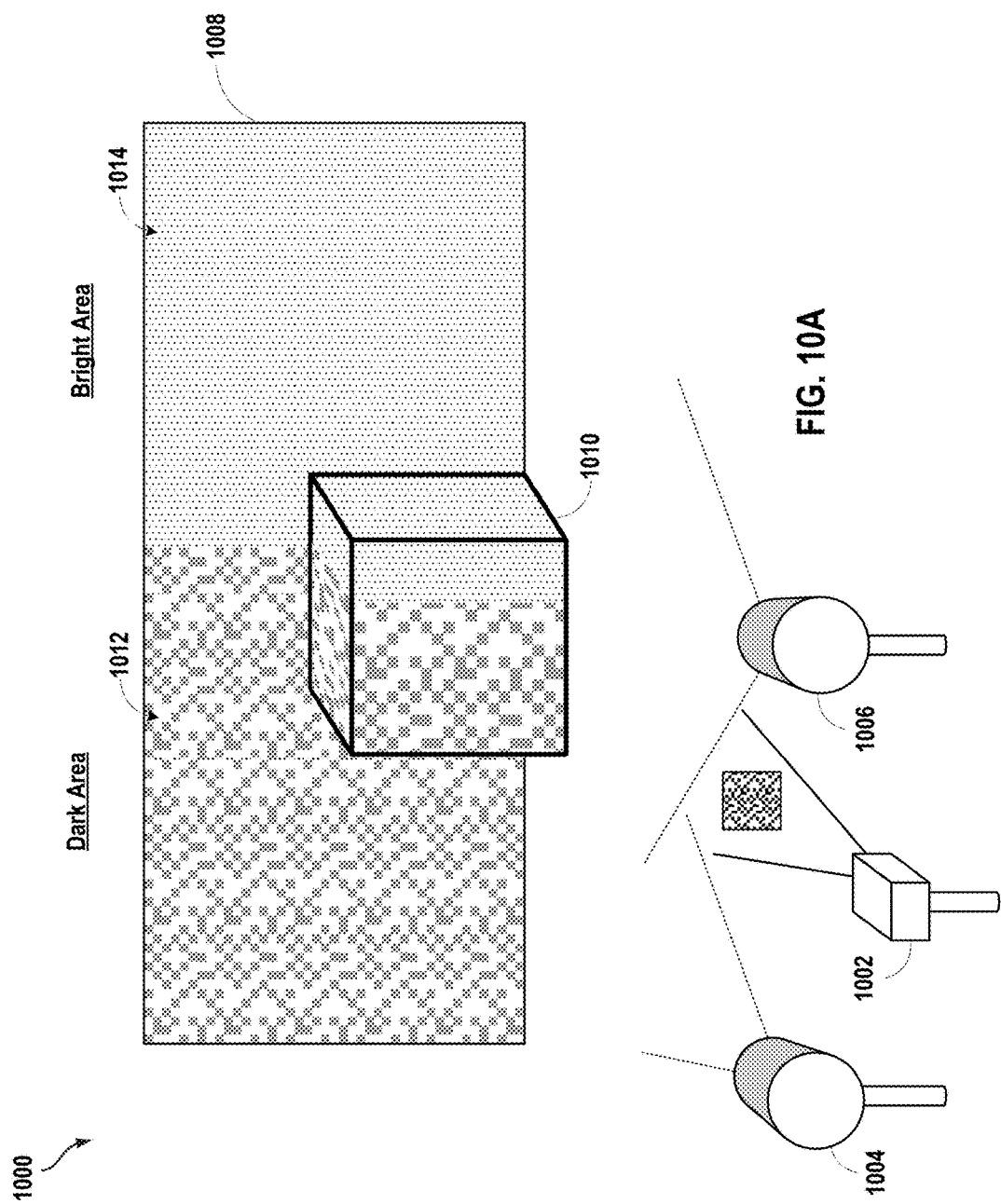

IMAGER FOR DETECTING VISUAL LIGHT AND PROJECTED PATTERNS

CROSS-REFERENCE TO RELATED APPLICATION

The present patent application is a divisional application of U.S. patent application Ser. No. 14/672,369, filed on Mar. 30, 2015, the entire contents of which are hereby incorporated by reference.

BACKGROUND

Robotic systems, such as a robotic manipulator containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic manipulator to pick up objects based on predetermined knowledge of where objects are in the environment.

In some examples, a robotic system may use computer vision techniques to determine a representation of three-dimensional (3D) scene geometry. By way of example, a robotic system may triangulate information observed from a scene to determine a depth to one or more surfaces in a scene. One approach to depth sensing is the use of stereo image processing. According to this approach, two optical sensors with a known physical relationship to one another are used to capture two images of a scene. By finding mappings of corresponding pixel values within the two images and calculating how far apart these common areas reside in pixel space, a computing device can determine a depth map or image using triangulation. The depth map or depth image may contain information relating to the distances of surfaces of objects in the scene.

Another approach to depth sensing using structured-light processing may be employed. The main idea of structured-light processing is to project a known illumination pattern onto a scene, and capture an image of the scene that includes the projected pattern. For example, as shown in FIG. 1, a projector 102 may project a known texture pattern onto an object 104, and an optical sensor 106 (e.g., a camera) may capture an image 108 of the object 104. A computing device may then determine a correspondence between a region in the image and a particular part of the projected pattern. Given a position of the projector 102, a position of the optical sensor 106, and the location of the region corresponding to the particular part of the pattern within the image 108, the computing device may then use triangulation to estimate a depth to a surface of the object 104.

Typically the projector 102 and optical sensor 106 are displaced horizontally along a baseline, and the projector 102 and optical sensor 106 are calibrated. The calibration process may map a pixel in the optical sensor 106 to a one-dimensional curve of pixels in the projector 102. If the sensor image and the projector image are rectified, then this curve may take the form of a horizontal line. In this case, the search for matches to the projected texture pattern can proceed along this line, making the process more efficient.

SUMMARY

Depth sensing in environments that environments with bright and dim portions can be improved using an imager capable of sensing both projected patterns and visible light. As described herein, a pair of imagers may capture one or more infrared light images of the projected pattern and a pair of visible light images of the environment. A computing device may determine a first depth estimate for a surface in a scene from at least one of the infrared light images using structured-light processing. The computing device may also determine a second depth estimate for a surface in the scene from the pair of stereo images using stereo image processing. The computing device may then combine the first and second depth estimates to determine a combined depth estimate for one or more surfaces in the environment.

In one example, a system that includes a first optical sensor, a second optical sensor, a light source, and a computing device is provided. Each optical sensor includes a first plurality of photodetectors configured to capture visible light interspersed with a second plurality of photodetectors configured to capture infrared light within a particular infrared band. The light source is configured to project infrared light of a wavelength within the particular infrared band onto an environment. The computing device is configured to identify first corresponding features of the environment between a first visible light image captured by the first optical sensor and a second visible light image captured by the second optical sensor. The computing device is also configured to identify second corresponding features of the environment between a first infrared light image captured by the first optical sensor and a second infrared light image captured by the second optical sensor. The computing device is further configured to determine a depth estimate for at least one surface in the environment based on the first corresponding features and the second corresponding features.

In another example, an optical sensor that includes a planar array of photodetectors, a light filter array, and a control circuit is provided. The planar array of photodetectors includes a first plurality of photodetectors and a second plurality of photodetectors. Each photodetector is configured to generate a charge based on an intensity of light incident on the photodetector. The light filter array is coupled to the planar array of photodetectors. The light filter array includes a first plurality of filters configured to pass visible light onto the first plurality of photodetectors and a second plurality of filters configured to pass infrared light within a particular infrared band onto the second plurality of photodetectors. The first plurality of filters is interspersed with the second plurality of filters. The control circuit is configured to generate a visible light image based on charges from the first plurality of photodetectors. The control circuit is also configured to generate an infrared light image based on charges from the second plurality of photodetectors.

In still another example, a method is provided that involves receiving, from a first plurality of photodetectors of a first optical sensor, a first visible light image of an environment as perceived from a first viewpoint. The method also involves receiving, from a first plurality of photodetectors of a second optical sensor, a second visible light image of the environment as perceived from a second viewpoint. The method further involves receiving, from a second plurality of photodetectors of the first optical sensor, a first infrared light image of the environment as perceived from the first viewpoint. The second plurality of photodetectors of the first optical sensor is configured to capture infrared light within a particular infrared band. Additionally, the method involves receiving, from a second plurality of photodetectors of the second optical sensor, a second infrared light image of the environment as perceived from the second viewpoint. The second plurality of photodetectors of the second optical sensor is configured to capture infrared light within the particular infrared band. Further, the method involves identifying, by the computing device, first corresponding features of the environment between the first visible light image and the second visible light image. The method also involves identifying, by the computing device, second corresponding features of the environment between the first infrared light image and the second infrared light image. The method further involves determining, by the computing device, a depth estimate for at least one surface in the environment based on the first corresponding features and the second corresponding features.

In still another example, a system is provided that includes means for receiving, from a first plurality of photodetectors of a first optical sensor, a first visible light image of an environment as perceived from a first viewpoint. The system also includes means for receiving, from a first plurality of photodetectors of a second optical sensor, a second visible light image of the environment as perceived from a second viewpoint. The system further includes means for receiving, from a second plurality of photodetectors of the first optical sensor, a first infrared light image of the environment as perceived from the first viewpoint. The second plurality of photodetectors of the first optical sensor is configured to capture infrared light within a particular infrared band. Additionally, the includes means for receiving, from a second plurality of photodetectors of the second optical sensor, a second infrared light image of the environment as perceived from the second viewpoint. The second plurality of photodetectors of the second optical sensor is configured to capture infrared light within the particular infrared band. Further, the system includes means for identifying, by the computing device, first corresponding features of the environment between the first visible light image and the second visible light image. The system also includes means for identifying, by the computing device, second corresponding features of the environment between the first infrared light image and the second infrared light image. The system further includes means for determining, by the computing device, a depth estimate for at least one surface in the environment based on the first corresponding features and the second corresponding features.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 4 is a conceptual illustration of the functionality of an example optical sensor, according to an example embodiment.

FIG. 10A is a conceptual illustration of an example environment, according to an example embodiment, according to an example embodiment.

DETAILED DESCRIPTION

Figure 1:
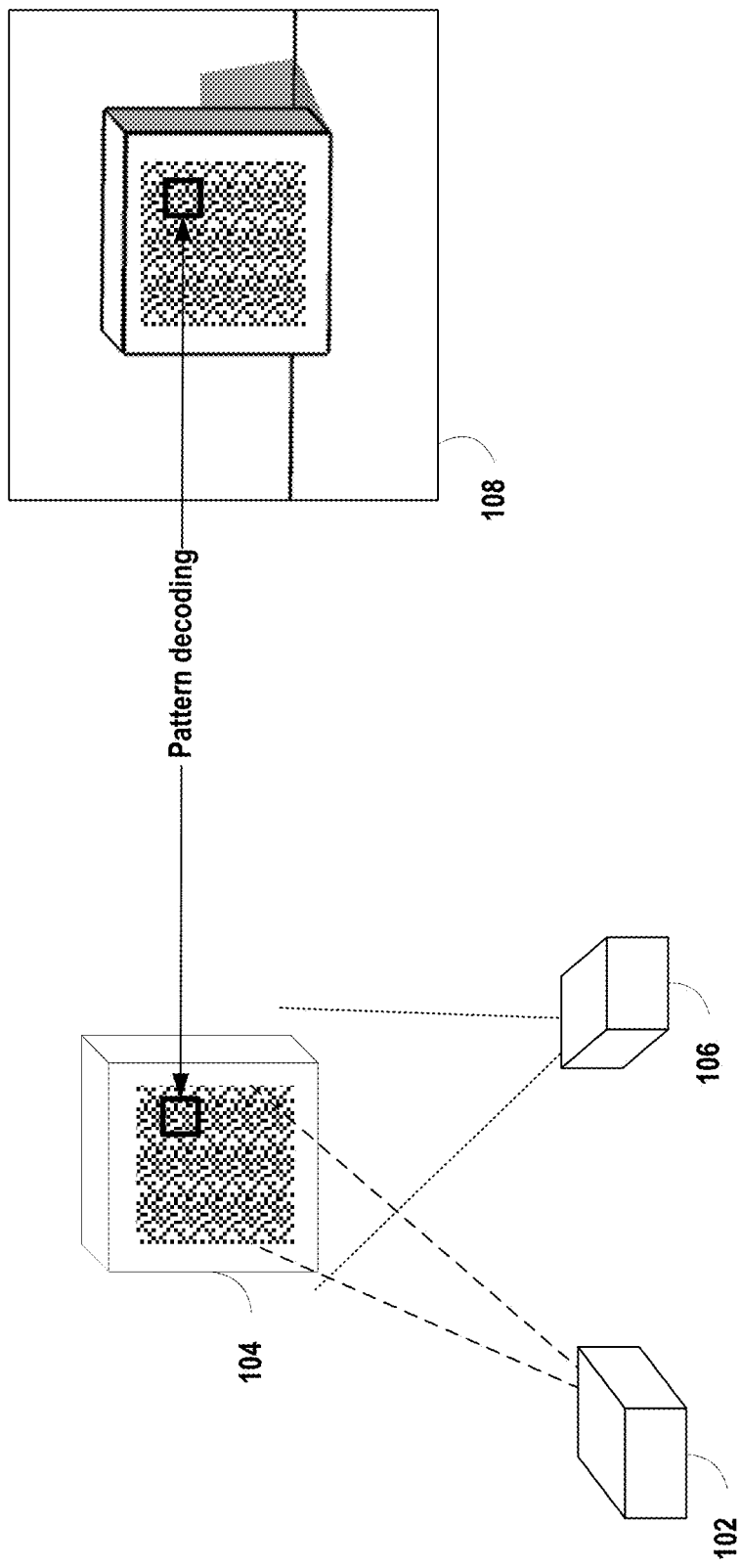
FIG. 1 is a conceptual illustration of an example approach for structured-light processing.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein. Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Methods, optical sensors, and robotic systems that may improve depth sensing in environments with a wide luminance range are provided herein. A robotic system equipped with a computer vision system may operate within a variety of environments with varying levels of lighting. Certain environments—such as outdoor environments during the daytime and well-lit indoor environments—may be well suited for depth sensing using stereo image processing. When objects in environments are brightly illuminated, an imager sensing light reflected off those objects can capture considerable detail of those objects' features (e.g. shape, color, contours, edges, etc.). However, in other environments—such as indoor environments with dim artificial lighting and nighttime environments—less light may be reflected off objects, making discernment of those objects' features more difficult. Furthermore, because stereo image-based depth sensing primarily depends upon identifying common features between two images taken from different perspectives, it may be difficult to determine the depth of objects that have few detectable features, such as those without many color variations, edges, contours, or other artifacts (e.g. large, single-colored flat surfaces).

In dimmer environments and/or environments with objects having few detectable features, a structured-light approach can improve depth sensing by projecting patterned light onto a scene and capturing images of that scene with the projected pattern. The projected pattern shines artificial features onto objects and surfaces that might otherwise have too few features or be too dimly lit for accurate depth sensing. Thus, by employing structured-light processing to images capturing an environment with a projected pattern, accurate depth sensing may be achieved for surfaces in an environment that might otherwise be too dark or have too few features. In some implementations, the projected pattern may be light of a wavelength within a particular infrared wavelength band. While this structured-light technique may be useful in darker and some indoor environments, the projected pattern may be washed out or overcome by a different light source, such as sunlight.

During operation, a robotic system may transition between bright and dark environments and/or from indoor to outdoor environments. In some cases, a robotic system may encounter environments that have a combination of bright portions and dark portions. For instance, a partially indoor and partially outdoor scene might have bright sunlit surfaces contrasted against dark shadows. In these scenarios, a robotic system might benefit from depth sensing using a combination of stereo image processing and structured light processing.

An optical sensor of the present application may be capable of detecting light in one or more wavelength bands (e.g. a visible light band and/or an infrared light band). According to various embodiments, the optical sensor includes a combination of visible-sensing photodetectors interspersed with infrared-sensing photodetectors. The visible-sensing and infrared-sensing photodetectors can be arranged in a variety of manners discussed herein. Control circuitry of the optical sensor may generate visible light images using the visible-sensing photodetectors and infrared light images using the infrared-sensing photodetectors. As a result, one such optical sensor may capture images in two different wavelength bands of light.

A single optical sensor capable of capturing both visible light images and infrared light images may be more resource efficient compared to two separate optical sensors that each independently capture either visible light images or infrared light images. Reducing the number of optical sensors may be desired when space resources are limited, such as on small robotic systems. Furthermore, the single optical sensor may require less energy to operate and might increase the reliability of the robotic system by reducing the number of sensors susceptible to failure.

In addition to the above-described benefits, a single optical sensor that intermixes both visible-sensing photodetectors and infrared-sensing photodetectors reduces the effects of the systematic errors that would otherwise be present if two separate optical sensors were used. Furthermore, certain interspersed arrangements of the visible-sensing photodetectors and the infrared-sensing photodetectors may be employed to avoid or further reduce the effects of the systematic errors. Thus, using a single optical sensor avoids the need to perform error-prone calibration techniques typically associated with using two different optical sensors.

According to various embodiments, an imaging system includes two or more of the above-described optical sensors (which may also be referred to herein as "imagers") configured to capture images of an environment from different viewpoints. The imaging system might stereoscopically image an environment or scene in multiple wavelength bands. Then, a computing device may use stereo image processing to generate multiple depth maps (e.g. depth information of surfaces) of the environment based on pairs of images from different viewpoints in each wavelength band. By combining the depth information derived from multiple wavelength bands into a single depth map, the computing device may generate a more complete and accurate depth map of an environment with a wide luminance range.

According to various embodiments, an imaging system may include two of the above-described optical sensors separated from each other by a known distance and each configured to capture images in both the visible light band and a particular infrared (IR) light band. The imaging system may also include a texture projector that projects a known structured-light pattern onto the environment within that particular IR light band. While this IR pattern projects features onto surfaces that improve depth determination (especially in low-light environments, where features of objects may be difficult to discern in the visible light spectrum), the projected pattern may be overcome or washed out by intense infrared light from other sources, such as artificial lighting and/or sunlight. As a result, some features—such as color differences, edges of objects, and/or portions of the projected pattern—may only be perceived in either the visible light band or the particular IR light band.

In one example, a computing device may determine depth information of an environment based on corresponding features between a pair of visible light images captured by the imaging system. By way of example, the computing device may determine mappings of corresponding pixel values within the two visible light images, and based on a physical relationship between the two optical sensors, the computing device can determine depth information using triangulation. In environments with a wide luminance range, the visible light-based depth information may provide depths for the well-illuminated portions of the environment. The computing device may also determine depth information of the environment based on corresponding features between a pair of IR light images captured by the imaging system. The IR light-based depth information may provide depths for the dimly-lit portions of the environment. Then, the computing device may combine the depth information derived from both the visible light images and the IR light images to determine a more comprehensive and accurate depth map of the surfaces in the environment.

Various additional examples are described below, therefore the above examples are not meant to be limiting. Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Additionally, although portions of this disclosure refer to implementing the described methods and apparatuses to facilitate manipulation (e.g., loading and/or unloading) of boxes and/or other objects, the methods and apparatuses may be implemented in other environments as well. For instance, the methods and apparatuses may be implemented generally in any environment to determine the 3D geometry of the environment or 3D geometry of objects in the environment. By way of example, the methods and apparatuses may be implemented to help determine the 3D geometry of a room in a house or an office in building, or perhaps the 3D geometry of a portion of an arena, conference center, or shopping mall. Similarly, the methods and apparatuses may be utilized in outdoor environments as well.

According to various embodiments, described herein are methods and systems for automated loading and/or unloading of boxes and/or other objects, such as into a storage container or from a vehicle. In some example embodiments, boxes or objects may be automatically organized and placed onto pallets (palletized) or automatically removed from pallets (depalletized). Within examples, automating the process of loading/unloading trucks and/or the process of palletizing/depalletizing objects may provide a number of industrial and business advantages.

According to various embodiments, automating the process of loading/unloading trucks and/or the process of palletizing/un-palletizing objects may include the incorporation of one or more robotic devices to move objects or perform other functions. In some embodiments, a robotic device can be made mobile by coupling the robotic device with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or 3D depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet while the term "depalletizing" refers to removing boxes from a pallet. In addition, the terms "palletizing" and "depalletizing" can each be used to imply the other.

Figure 2A:
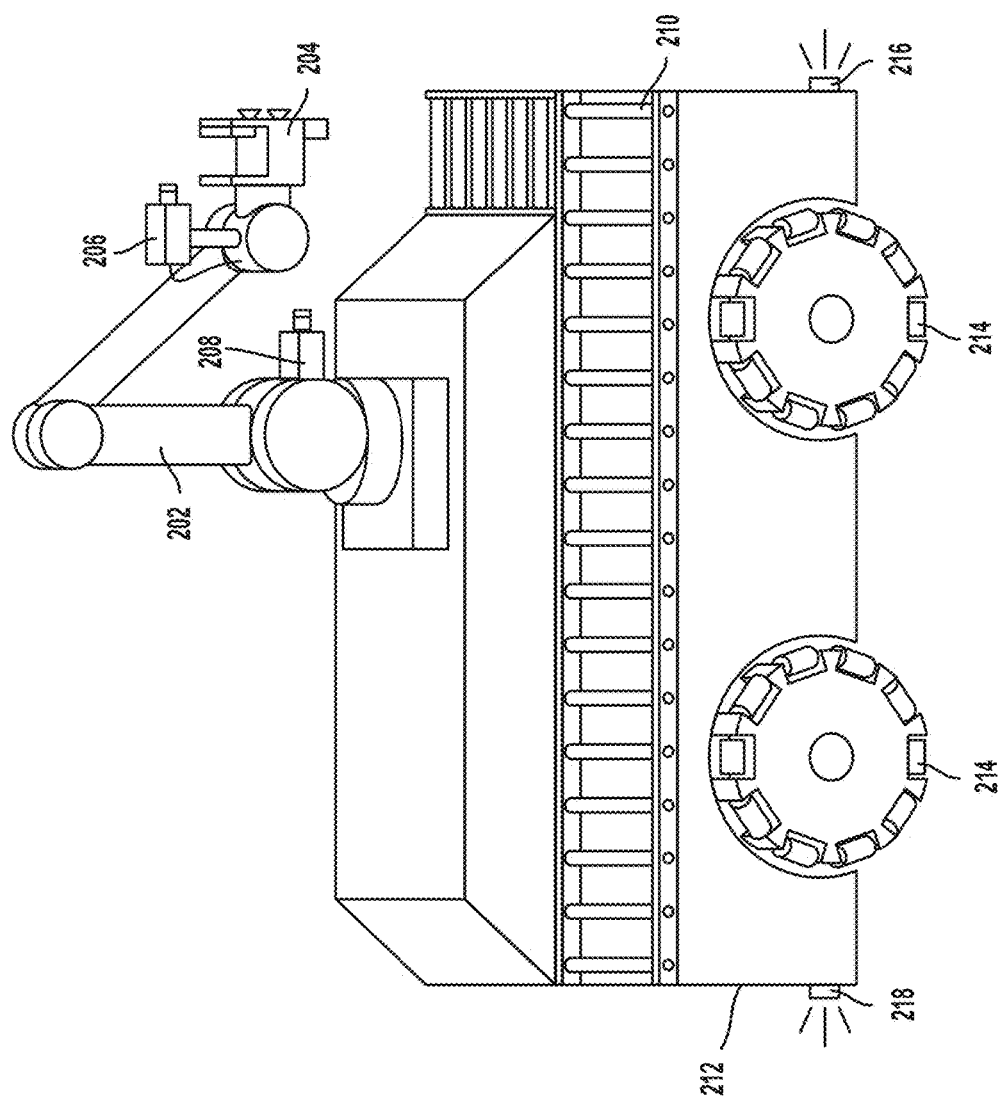
FIG. 2A shows a robotic arm mounted on a moveable cart, according to an example embodiment.

According to various embodiments, a robotic manipulator may be mounted on a holonomic cart (e.g., a cart with wheels that allow the cart to move in any direction). FIG. 2A depicts an exemplary holonomic cart containing a robotic manipulator. In some embodiments, a moveable cart 212 may include a robotic arm 202 mounted on the cart 212. The robotic arm 202 may contain a gripping component 204 for gripping objects within the environment. The cart may contain one or more wheels 214, which may be holonomic wheels that operate with two degrees of freedom. In further embodiments, a wraparound front conveyor belt 210 may be included on the holonomic cart 212. In some examples, the wraparound front conveyer belt 210 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 2B:
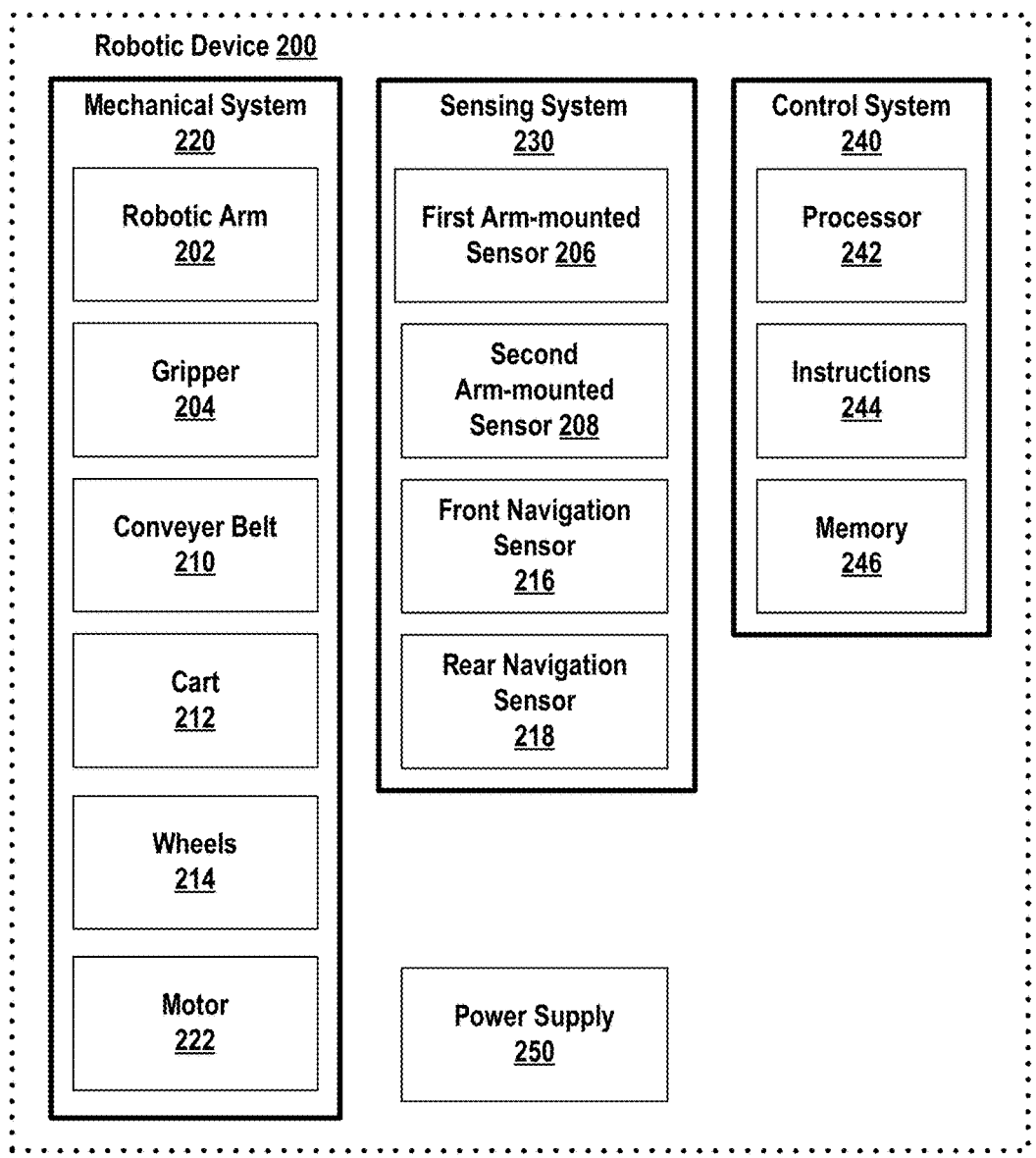
FIG. 2B is a functional block diagram illustrating a robotic device, according to an example embodiment.

FIG. 2B is a functional block diagram illustrating a robotic device 200, according to an example embodiment. The robotic device 200 could include various subsystems such as a mechanical system 220, a sensing system 230, a control system 240, as well as a power supply 250. The robotic device 200 may include more or fewer subsystems and each subsystem could include multiple elements. Further, each of the subsystems and elements of robotic device 200 could be interconnected. Thus, one or more of the described functions of the robotic device 200 may be divided up into additional functional or physical components, or combined into fewer functional or physical components. In some examples, additional functional and/or physical components may be added to the examples illustrated by FIGS. 2A and 2B.

The mechanical system 220 may include components described above with respect to FIG. 2A, including a robotic arm 202, a gripper 204, a conveyer belt 210, a (movable or holonomic) cart 212, and one or more wheels 214. The mechanical system 220 may additionally include a motor 222, which may be an electric motor powered by electrical power, or may be powered by a number of different energy sources, such as a gas-based fuel or solar power. Additionally, motor 222 may be configured to receive power from power supply 250. The power supply 250 may provide power to various components of robotic device 200 and could represent, for example, a rechargeable lithium-ion or lead-acid battery. In an example embodiment, one or more banks of such batteries could be configured to provide electrical power. Other power supply materials and types are also possible.

The sensing system 230 may use one or more sensors attached to a robotic arm 202, such as sensor 206 and sensor 208, which may be 2D sensors and/or 3D depth sensors that sense information about the environment as the robotic arm 202 moves. The sensing system may determine information about the environment that can be used by control system 240 (e.g., a computer running motion planning software) to pick and move boxes efficiently. The control system 240 could be located on the device or could be in remote communication with the device. In further examples, scans from one or more 2D or 3D sensors mounted on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system 240 may cause the mobile base to navigate into a position for unloading or loading.

In additional examples, planar surface information may be extracted from 3D sensors to model walls, the floor/ceiling, and/or box faces. After modeling the floor, projecting objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distances from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some embodiments, the suction devices can sense after a certain amount time whether they can successfully grip a surface, after which they may automatically shut off. In further embodiments, sections of the suction devices can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side-to-side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 200 could be controlled by control system 240. Control system 240 may include at least one processor 242 (which could include at least one microprocessor) that executes instructions 244 stored in a non-transitory computer readable medium, such as the memory 246. The control system 240 may also represent a plurality of computing devices that may serve to control individual components or subsystems of the robotic device 200 in a distributed fashion.

In some embodiments, memory 246 may contain instructions 244 (e.g., program logic) executable by the processor 242 to execute various functions of robotic device 200, including those described above in connection with FIGS. 2A-2B. Memory 246 may contain additional instructions as well, including instructions to transmit data to, receive data from, interact with, and/or control one or more of the mechanical system 220, the sensor system 230, and/or the control system 240.

Figure 3A:
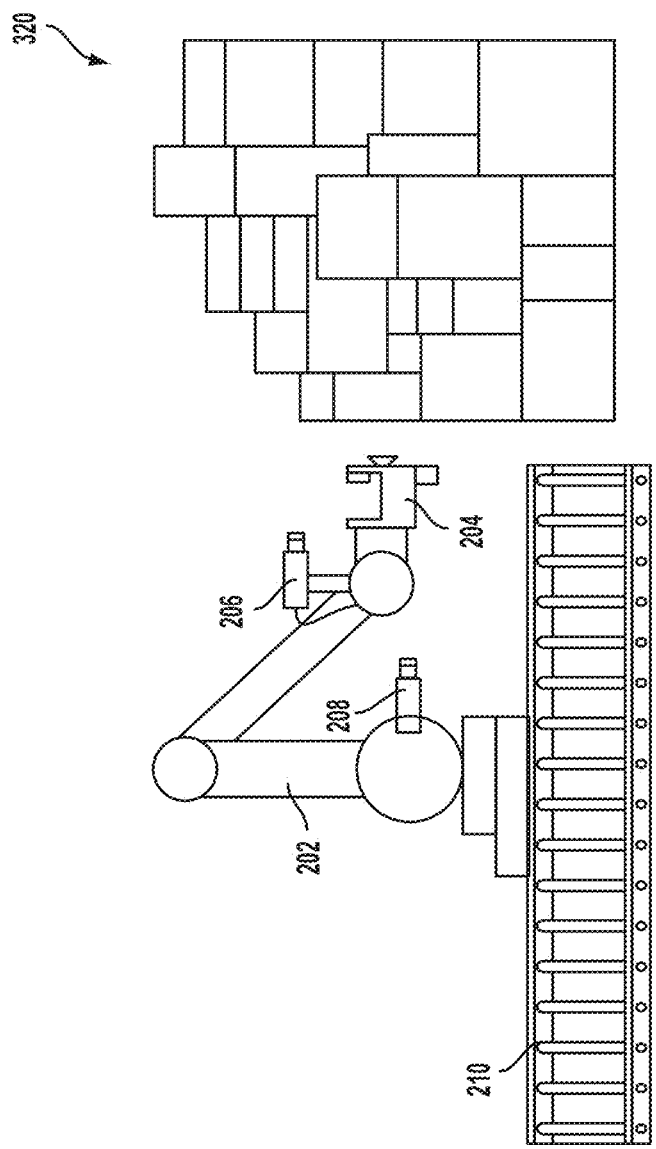
FIG. 3A shows a robotic arm and a stack of boxes, according to an example embodiment.

According to various embodiments, a perception guided robot is described. For instance, a robotic device may utilize a combination of perception together with planning to guide the robot arm to pick up a box and place the box where it needs to go. FIG. 3A illustrates part of the robotic device from FIG. 2A with a stack of boxes, according to an example embodiment. As shown, the robotic device may include a robotic arm 202 with a gripping component 204, sensors 206 and 208, and conveyer 210 as described above. In some examples, the robotic device could be mounted on a holonomic cart as described with respect to FIG. 2A, could be mounted on a different type of movable apparatus, could be mounted on rails or tracks, or could be stationary. The robotic device may be controlled to pick boxes from a stack of boxes 320 containing a heterogeneous mix of shapes and sizes of boxes.

Figure 3B:
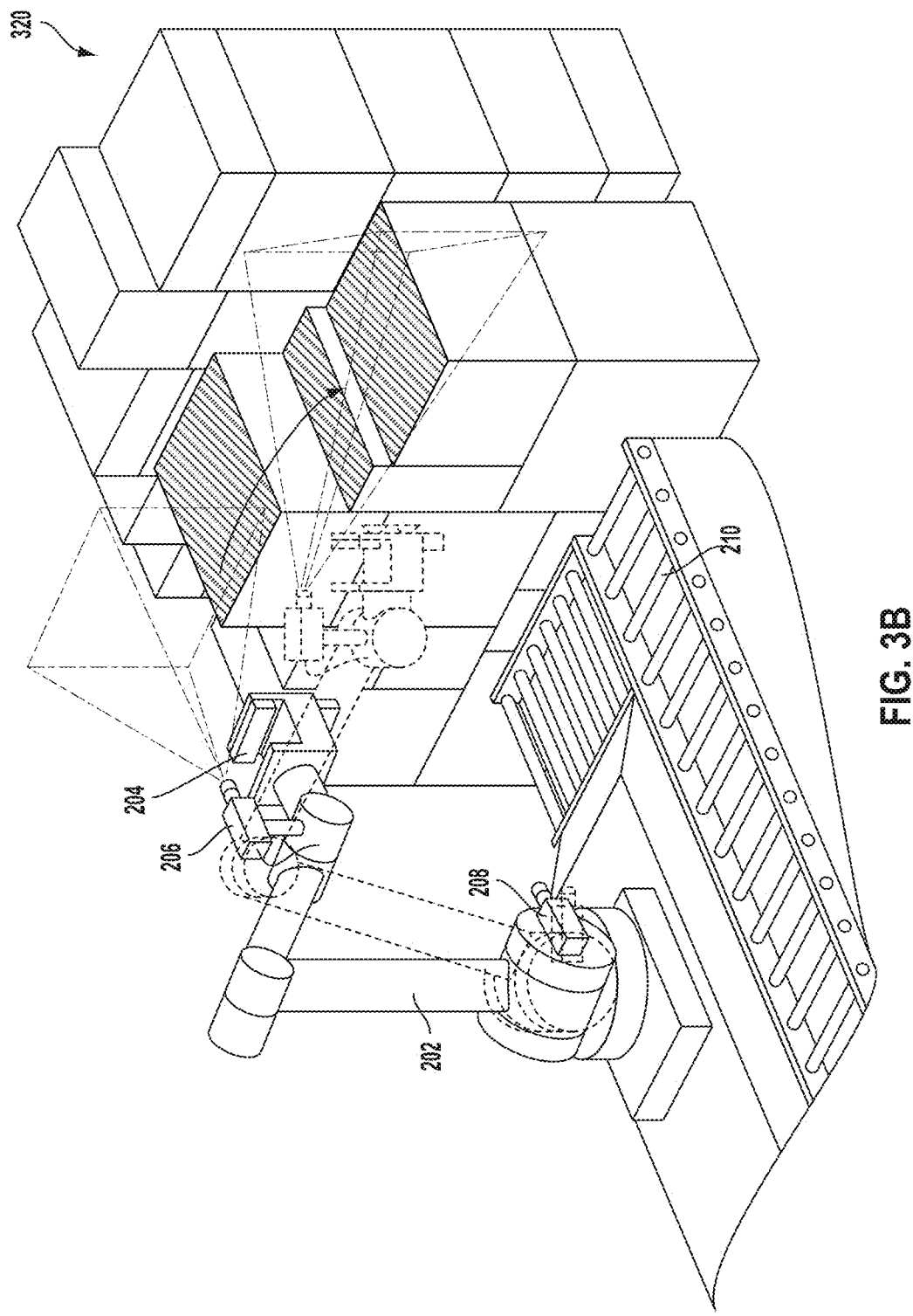
FIG. 3B shows scanning of the stack of boxes from FIG. 3A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 3B. As the robotic arm 202 moves, a sensor 206 on the arm may capture sensor data about the stack of boxes 320 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

Figure 3C:
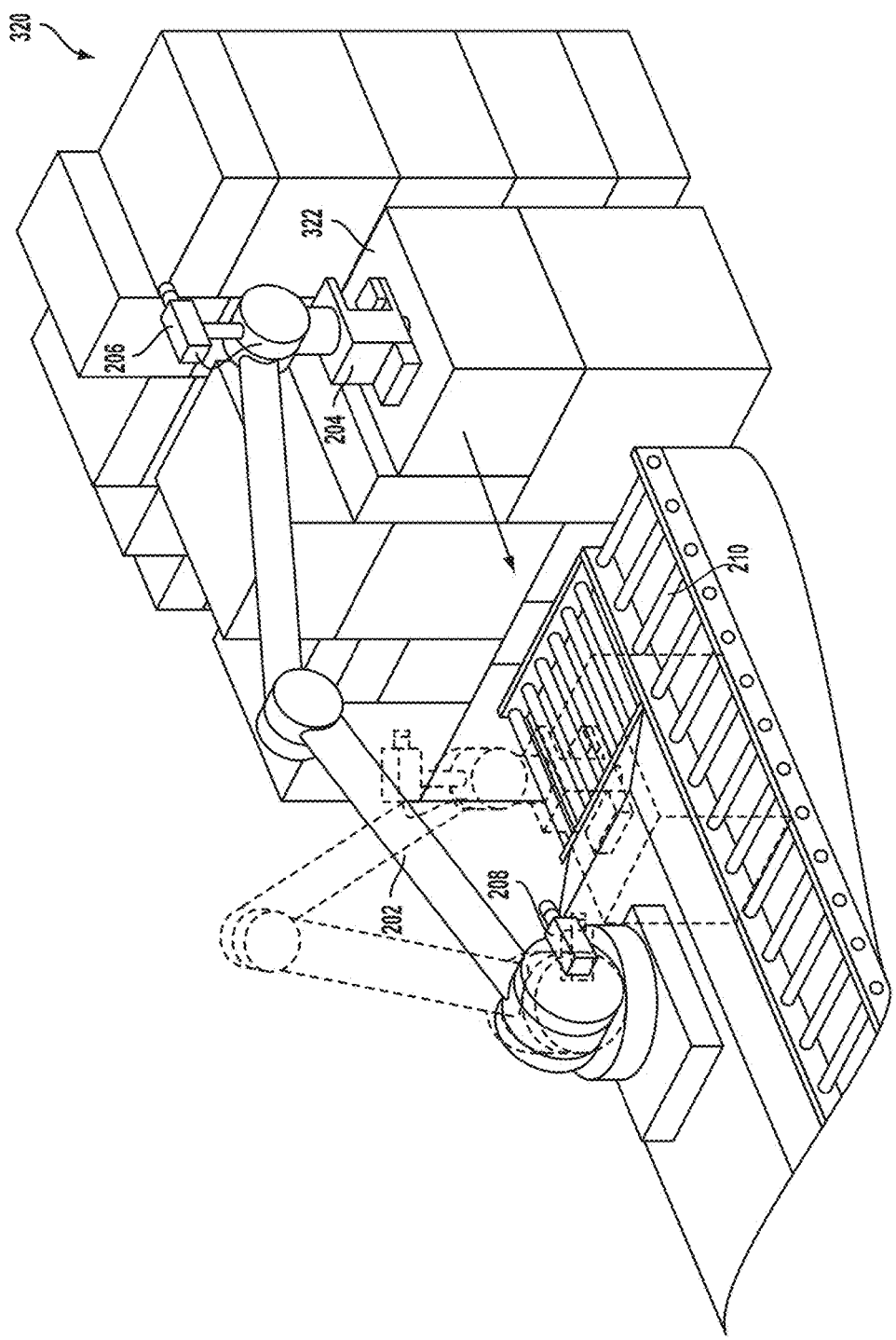
FIG. 3C shows the robotic arm from FIG. 3A moving a box, according to an example embodiment.

In further examples, a facade may be constructed from boxes, for instance to plan an order for picking up the boxes. For instance, as shown in FIG. 3C, box 322 may be identified by the robotic device as the next box to pick up. Box 322 may be identified within a facade representing a front wall of the stack of boxes 320 constructed based on sensor data collected by one or more sensors, such as sensors 206 and 208. A control system may then determine that box 322 is the next box to pick, possibly based on its shape and size, its position on top of the stack of boxes 320, and/or based on characteristics of a target container or location for the boxes. The robotic arm 202 may then be controlled to pick up the box 322 using gripper 204 and place the box 322 onto the conveyer belt 210 (e.g., to transport box 322 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path.

An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters defining a position of an object in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, or 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm to the right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or palletizing/depalletizing may be to achieve: (1) a dense packing with minimal air gaps in between boxes, and/or (2) a stable packing that will not easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items in real-time. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of a particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

FIG. 4 is a conceptual illustration 400 of the functionality of an example optical sensor 402. The optical sensor 402 includes an array of photodetectors, such as photodetector 404. Some of the photodetectors in the array are configured to generate a charge when exposed to an incident beam of light whose wavelength is within the visible spectrum (e.g. 380 nm to 750 nm). The other photodetectors in the array are configured to generate a charge when exposed to an incident beam of light whose wavelength is within the infrared spectrum (e.g. 750 nm to 3000 nm). In some embodiments, the infrared-sensing photodetectors are configured to capture a narrow band of infrared light (e.g. 825 nm to 875 nm). In structured-light embodiments, an infrared texture projector may project patterned light within such a narrow band of infrared light.

The visible-sensing photodetectors and the infrared-sensing photodetectors may be arranged in a variety of manners. In some embodiments, the visible-sensing photodetectors may be interspersed with the infrared-sensing photodetectors, such that there is a substantially even mixture of each type of photodetector across the array of photodetectors. Various manners of arranging visible-sensing and infrared-sensing photodetectors are contemplated herein and discussed further in more detail below.

In some implementations, the array of photodetectors may be coupled to an array of light filters. The light filters may be overlaid on top of the photodetectors such that light incident on a particular photodetector first passes through a respective light filter. Each light filter may act as a band-pass filter that passes through light whose wavelength is within a particular band, while blocking or attenuating light whose wavelength is outside of that particular band. As described herein, photodetectors that are "configured to" capture or detect a certain wavelength of light may be implemented as a photodetector coupled to such a light filter as described above.

During operation, visible light 406 and infrared (IR) light 408 incident on optical sensor 402 may be captured by the optical sensor's visible-sensing photodetectors and infrared-sensing photodetectors, respectively. The optical sensor may include control circuitry and/or processing devices configured to generate a visible light image 410 and an IR light image 412 from the charges in the photodetectors. These images may then be provided to a computing device for use in stereo image processing and depth sensing, among other possible uses.

Note that the particular wavelength bands with which the visible light photodetectors and the infrared light photodetectors capture light may vary depending on the particular implementation. Additionally, the rate of drop off at the edges of these wavelength bands may also vary depending on the specific implementation. It should be understood that the boundaries of the visible-light band and the infrared-light band might vary among implementations.

Also note that "visible light image" as described herein may, in some instances, refer to a panchromatic image (e.g. a grayscale image sensitive to colors of light in the visible spectrum). In other instances, photodetectors may be provided for separately sensing red, green, and blue visible light. In such instances, an optical sensor's control circuitry may perform demosaicing or other image processes in order to construct a color image. "Visible light images" as described herein may refer to either panchromatic images or color images.

Figure 5A:
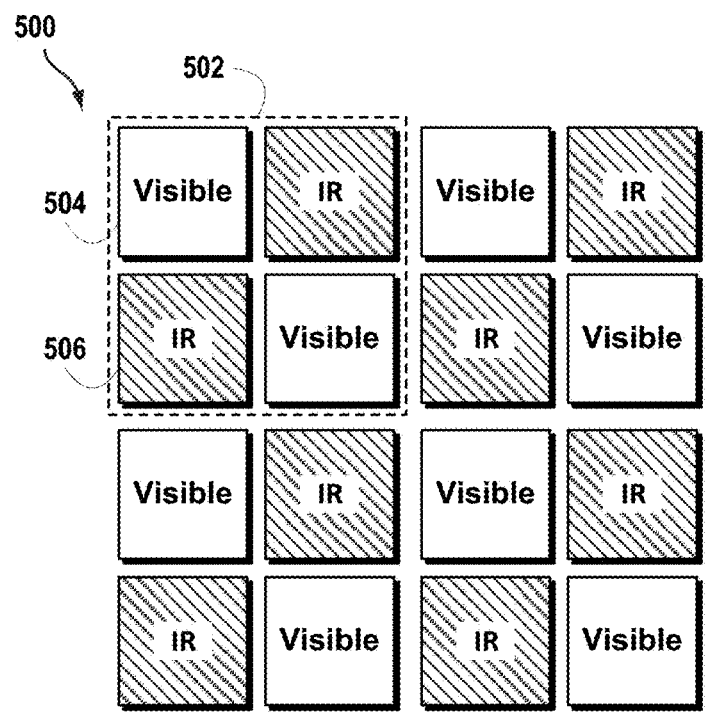
FIG. 5A is a conceptual illustration of an example arrangement of photodetectors on an example optical sensor, according to an example embodiment.

FIG. 5A is a conceptual illustration of an example arrangement 500 of photodetectors on an example optical sensor, according to an example embodiment. The example arrangement 500 depicted in FIG. 5 may be one example arrangement of the photodetectors for optical sensors of the present application, such as the optical sensor 402 illustrated in FIG. 4. The example arrangement 500 shown in FIG. 5 is a checkerboard pattern, where visible-sensing photodetectors and infrared-sensing photodetectors alternate both row-wise and column-wise. However, it should be understood that a variety of other photodetector patterns may be used on a particular optical sensor, depending upon the particular implementation.

During operation, the optical sensor may capture a visible light image using its visible-sensing photodetectors and an infrared light image using its infrared-sensing photodetectors. As described herein, these images may be used in stereo image processing to determine the depth of a surface in an environment. Such stereo image processing may involve determining a pixel location of a feature within an image from one perspective (e.g. from a first optical sensor) and comparing it to a pixel location of that feature within an image from a different perspective (e.g. from a second optical sensor). Using triangulation, the depth of that feature may be determined based on a known distance between the two different perspectives (e.g. distance between the first and second optical sensor) and the relative pixel locations of that feature in the two images.

Depth sensing techniques of the present application involve performing such stereo image processing with two different types of light—infrared light and visible light—to determine depth estimates in two different bands (e.g. wavelength bands or frequency bands) of light. Then, those depth estimates may be combined to form a combined depth estimate for at least one surface in an environment. However, because visible-sensing photodetectors and the infrared-sensing photodetectors do not occupy the exact same positions on the photodetector but are rather interspersed in a planar array, some amount of inaccuracy may be present when combining the two separate depth estimates.

As one example, a visible light image may include a feature captured by visible-sensing photodetector 504, while an infrared light image may include that same feature captured by infrared-sensing photodetector 506. This feature may appear to occupy the same pixel location in both the visible light image and the infrared light image, although the physical positions of the respective photodetectors that captured the feature are different (in this example, the distance between photodetector 504 and photodetector 506). This slight inaccuracy may vary depending on the particular pattern with which the visible-sensing photodetectors and infrared-sensing photodetectors are interspersed. The checkerboard pattern illustrated in FIG. 5 is one example arrangement of photodetectors that reduces such inaccuracy.

In addition to reducing such inaccuracy, the checkerboard pattern illustrated in FIG. 5 provides reduced systematic error. Consider a different arrangement of photodetectors where visible-sensing photodetector columns alternate with infrared-sensing photodetector columns. An imaging system utilizing two such column-alternating optical sensors might be subject to increased systematic error. If the two optical sensors are poorly calibrated, the relative pixel positions within a captured image might be offset, resulting in a systematic error. This offset could affect the accuracy of the pixel locations for entire columns of photodetectors. By alternating the photodetector type along both rows and columns (e.g. the checkerboard pattern), such a systematic bias may be avoided or its effects significantly reduced.

In some embodiments, this inaccuracy may be accounted for or corrected using software and/or techniques based on the known arrangement of photodetectors. Consider the photodetector arrangement 500 in FIG. 5 to be the entire optical sensor, consisting of 16 photodetectors—8 visible-sensing photodetectors and 8 infrared-sensing photodetectors. In an example embodiment, the 8 visible-sensing photodetectors might be used to generate a 2×2 panchromatic image from light in the visible spectrum, whereas the 8 infrared-sensing photodetectors might be used to generate a 2×2 image from light in a narrow-band infrared spectrum. In this example, each mosaic (such as mosaic 502) might correspond to a single pixel in an image; that is, the two visible-sensing photodetectors correspond to a pixel in the visible light image, while the two infrared-sensing photodetectors correspond to a pixel in the infrared light image. Charges generated by two photodetectors of the same type within a mosaic might be averaged when generating the pixel for an image. Although the resolution of the resulting image is reduced (because two photodetectors contribute to a single pixel), systematic bias is reduced; light from a feature captured by a particular mosaic is represented at the same pixel location in the visible light image and the infrared light image.

In other embodiments, the visible-sensing photodetectors may be arranged in an alternating pattern with the infrared-sensing photodetectors. As one example, each row in the array may alternate between visible-sensing and infrared-sensing photodetectors. As another example, each column in the array may alternate between visible-sensing and infrared-sensing photodetectors. In additional embodiments, the optical sensor may arrange the visible-sensing and infrared-sensing photodetectors in a repeating pattern or mosaic. For example, various square tiling patterns may be implemented that combine any number of visible-sensing and infrared-sensing photodetectors within a mosaic. A given mosaic may include any number of photodetectors. Regardless of the particular arrangement of photodetectors, the optical sensor may have some combination of visible-sensing and infrared-sensing photodetectors that enable the optical sensor to capture both visible light images and infrared light images.

In some implementations, a robotic system utilizing an visible light- and infrared light-sensing optical sensor may be aware of, detect, or otherwise classify the environment it is currently in at a given moment. Such a robotic system may alter the operation of one or more photodetectors of the optical sensor based on the determined environment in which it is currently presiding. The control circuit of the optical sensor may be configurable during operation to change various operational aspects and parameters of the optical sensor, including an amount of gain to apply to the charges of each optical sensor and a length of time with which to expose the photodetectors to light (the exposure time), among other possible operational aspects. Different gain values and exposure times may be set for the visible-sensing photodetectors and the infrared-sensing photodetectors, in some implementations.

As one example, a robotic system may determine that it is operating in a daytime outdoor environment and responsively reduce the exposure time and/or gain values of the photodetectors. In some cases, the robotic system may reduce or otherwise set the exposure time of the visible-sensing photodetectors, while not reducing or otherwise changing the exposure time of the infrared-sensing photodetectors. If that robotic system moves into a dark indoor environment, the robotic system may responsively increase the exposure time and/or gain values of the visible-sensing photodetectors and/or the infrared-sensing photodetectors. The robotic system may encounter other scenarios that might require varying the gain values and/or exposure time of the visible-sensing photodetectors, the infrared-sensing photodetectors, or both.

In some instances, a robotic system may be designed to operate within a particular environment and is not expected to experience drastic changes in lighting. For example, a robotic system may be designed to operate solely in an indoor environment with few windows with relatively consistent artificial lighting. However, such an environment might still contain well-lit surfaces and shadowed surfaces, although the expected luminance range is smaller than in other mixed indoor and outdoor environments. A robotic system in such an environment might employ one or more optical sensors that each contains more visible-sensing photodetectors than infrared-sensing photodetectors.

For example, each infrared-sensing photodetector might be more sensitive to the infrared projected pattern, while each visible-sensing photodetector might be comparatively less sensitive to ambient light in the environment. Thus, certain optical sensors might be designed to include more of one type of photodetector compared to the other, depending upon its intended use. Furthermore, the manner in which the visible-sensing photodetectors and infrared-sensing photodetectors are arranged may vary depending upon the number of each type of photodetector and the intended purpose of the optical sensor. It should be understood that various photodetectors that combine any number of visible-sensing photodetectors and infrared-sensing photodetectors arranged in a variety of ways may be implemented, depending upon the implementation, intended use, and/or the kinds of environments that the robotic system is expected to encounter.

Note that, although 16 photodetectors are depicted in a 4-by-4 array, an optical sensor of the present application may include any number of photodetectors arranged a variety of dimensions. Also note that the term "mosaic" as referred to herein refers to a repeated grouping of photodetectors.

Figure 5B:
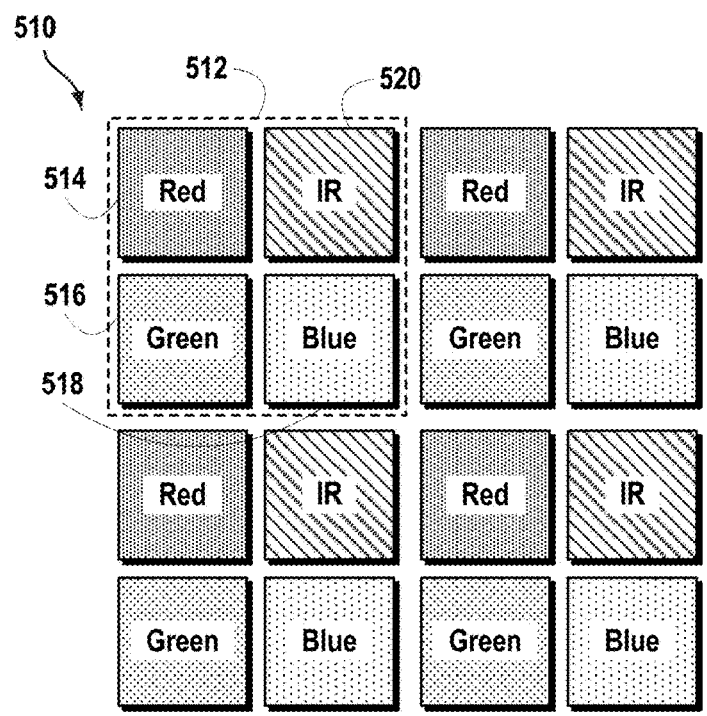
FIG. 5B is a conceptual illustration of another example arrangement of photodetectors on an example optical sensor, according to an example embodiment.

In some embodiments, the visible-sensing photodetectors may include photodetectors for separately capturing red, green, and blue (RGB) visible light. FIG. 5B is a conceptual illustration of an arrangement 510 of red-sensing, green-sensing, blue-sensing, and infrared-sensing photodetectors. Unlike the example optical sensor shown in FIG. 5A, where the visible-sensing photodetectors capture all visible light across a wide band, the visible-sensing photodetectors shown in FIG. 5B capture visible light in smaller, separate bands for red, green, and blue visible light.

In some embodiments, it may be desired to capture color images of an environment in addition to performing stereoscopic depth sensing. An optical sensor with photodetectors arranged like those in FIG. 5B may be employed in order to provide such color images. The control circuitry of such an optical sensor may combine light detected from the RGB photodetectors in order to generate a color image. In some cases, color images may enhance feature detection from visible light images by enabling the detection of subtle color changes that might be difficult to discern from panchromatic images.

It should be understood that "visible-sensing photodetectors" might herein refer to either wide-band visible light photodetectors that capture panchromatic images from all colors of visible light or a combination of photodetectors that detect smaller bands within the visible light spectrum (e.g. red light, green light, and blue light) for capturing color images.

Figure 6:
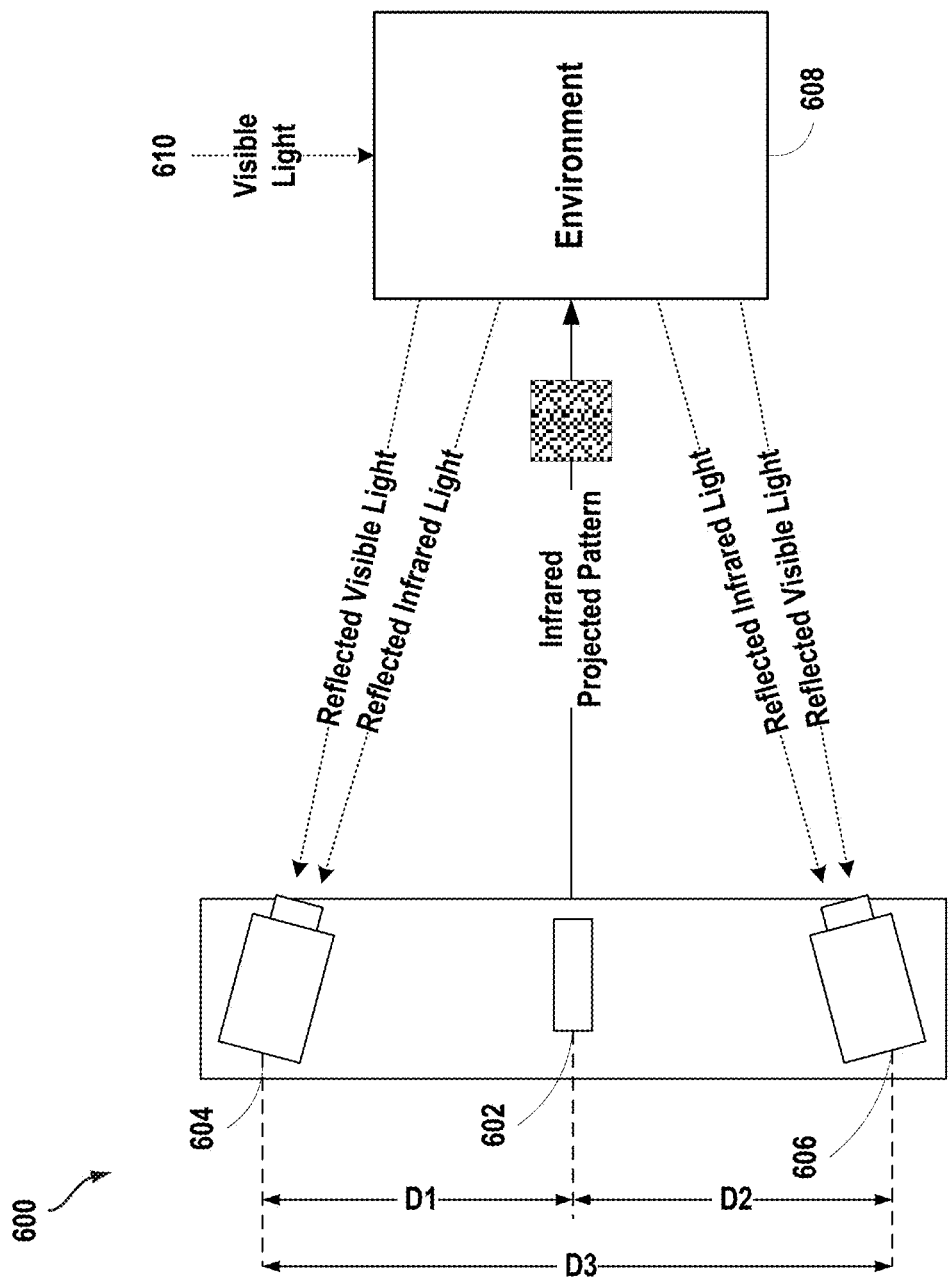
FIG. 6 is a conceptual illustration of an example stereo imaging system, according to an example embodiment.

FIG. 6 is a conceptual illustration of an example stereo imaging system 600 that includes a texture projector 602, a first optical sensor 604, and a second optical sensor 606. In FIG. 6, the first optical sensor 604 is shown separated from the texture projector 602 by a distance D1 and the second optical sensor 606 is shown separated from the texture projector 602 by a distance D2. The first optical sensor 604 is shown separated from the second optical sensor 606 by a distance of D3. In the stereo imaging system 600 of FIG. 6, the first optical sensor 604 and the second optical sensor 606 may observe the environment 608 from different angles (e.g. from different perspectives). Thus, the first optical sensor 604 may be used to capture images of the environment 608 from a first viewpoint, while the second optical sensor 606 may be used to capture images of the environment 608 from a second viewpoint.

The first optical sensor 604 and the second optical sensor 606 may be configured to capture both visible light images and infrared light images. In some embodiments, first optical sensor 604 and the second optical sensor 606 are similar to or the same as the optical sensor 402, and may have photodetectors arranged in a manner described above (including the arrangement 500 shown in FIG. 5).

The environment 608 may be at least partially illuminated by visible light 610. This visible light source may be sunlight or visible-spectrum artificial lighting (e.g. from incandescent light bulbs, fluorescent light bulbs, light-emitting diodes, etc.), among other possible visible light sources. The visible light 610 may brightly illuminate certain portions, objects, or surfaces within the environment 608, while other portions, objects, or surfaces within the environment 608 are shadowed or dimly lit.

The environment 608 may also be partially illuminated by an infrared projected pattern from the texture projector 602. The texture projector 602 may be an infrared light emitter or infrared projector. For instance, the texture projector may include a light source, projection optics, and a liquid crystal display (LCD) or other method of interrupting light with a pattern. The projected pattern may be a known combination of grids, dots, stripes, spots, horizontal bars, and/or vertical bars, among other shapes.

In some instances, the projected pattern may only be detectable when reflected from the portions, objects, or surfaces within the environment 608 that are shadowed or dimly lit. Certain visible light sources may, in addition to emitting visible light, emit infrared light that washes out or overcomes the infrared projected pattern.

In some embodiments, the projected pattern may be a known or otherwise predetermined pattern that is unique combination of shapes. When the pattern is predetermined, unique portions of that pattern may be located within captured infrared images and provide a reference point for triangulation. For example, once a unique portion of a predetermined pattern is identified from a captured image, properties of that unique portion of the predetermined pattern (such as its size and location) can be used as a basis to determine the depth of a surface on which that unique portion is projected. In implementations employed a known or predetermined projected pattern, structured-light depth sensing may require only one infrared image and the relative positions of the optical sensor and texture projector in order to generate a depth map. However, multiple infrared light images captured from different viewpoints may provide additional information that can be used to refine or verify the accuracy of the triangulation.

In other embodiments, the projected pattern may be randomly generated. In some implementations, multiple infrared light images may be captured of a changing randomly-generated projected pattern. A computing device employing structured-light processing may derive depth information for each infrared light image. The depth information corresponding to each different pattern can then be combined to generate a more accurate or complete depth map.

During operation, the first optical sensor 604 may capture a visible light image from visible light 610 reflected off the environment 608 and an infrared light image from the infrared projected pattern reflected off the environment 608. From a different viewpoint, the second optical sensor 606 may capture a visible light image from visible light 610 reflected off the environment 608 and an infrared light image from the infrared projected pattern reflected off the environment 608. The dark portions of the environment may appear to be black or very dark, depending upon the exposure time of the optical sensors, while the brightly-lit portions of the environment 608 may reveal detail and features of the illuminated surfaces in the visible light images. Conversely, the brightly-lit portions of the environment 608 may appear to white or washed out, depending upon the exposure time of the optical sensors, while the dark portions of the environment 608 may reveal the projected infrared pattern in the infrared light images.

A computing device may generate a depth image based on the two visible light images captured by the first optical sensor 604 and the second optical sensor 606. This may involve finding mappings of corresponding pixel values (e.g. pixel values of a particular feature) within the two visible light images and calculating how far apart these common areas reside in pixel space and using triangulation (based on, for example, the distance D3 between the two optical sensors) to determine a depth map or image. This depth map or depth image may contain information relating to the distances of surfaces of objects in the environment 608 based on features detected from the reflected visible light. However, surfaces of objects in shadows or dimly lit portions of the environment 608 may not reflect enough visible light in order for a distances of those surfaces to be accurately determined; thus, the depth map produced from the visible light images may accurately represent depths for some of the surfaces in the environment 608.

Similarly, the computing device may generate a depth image based on the two infrared light images captured by the first optical sensor 604 and the second optical sensor 606. The depth image or depth map may be generated for the infrared light images in a similar manner to that for the visible light images. This depth map or depth image may contain information relating to the distances of surfaces of objects in the environment 608 based on features detected from the reflected infrared light (including the infrared projected pattern). However, surfaces of objects in brightly illuminated portions of the environment 608 may reflect too much infrared light, thereby washing out otherwise detectable features and making the determination of distances of those surfaces difficult; thus, the depth map produced from the infrared light images may accurately represent depths for some of the surfaces in the environment 608.

The computing device may combine information from the depth map generated from the visible light images and the depth map generated from the infrared light images to determine a combined depth map of the environment 608. Because each depth map represents depths detected in different light spectra, combining the depth maps may provide a more comprehensive and/or accurate depth map for the whole environment 608.

In some embodiments, a depth map may be determined based on a single infrared light image captured by either the first optical sensor 604 or the second optical sensor 606. For example, a computing device may employ triangulation techniques based on the known distance between the texture project 602 and the first optical sensor 604 and the captured infrared image of the projected pattern onto environment 608 by the first optical sensor 604 to determine the depth map. Any combination of known distances D1, D2, and D3 and one or more infrared images captured by the first optical sensor 604 and/or the second optical sensor 606 may be used to determine a depth map.

In some instances, a depth map determined from visible light images and another depth map determined from infrared light images might contain overlapping depth information. When generating the combined depth map, the computing device may select the depth information from one of the two depth maps to use in the combined depth map. In some implementations, the computing device may average the depth information from both depth maps where overlapping depth information exists.

Although the depth map determined from visible light images requires at least two visible light images captured from two different viewpoints, the depth map determined from the infrared light images may only require a single infrared light image captured from one of those viewpoints. As described above, the infrared-based depth map may be determined using triangulation based on the known distance between the texture projector 602 and the optical sensor capturing the infrared light image. Thus, in other example stereo imaging systems, only one of the first optical sensor 604 and the second optical sensor 606 requires the capability to capture infrared images in order to carry out the combined depth map techniques from based on visible light and infrared light of the present application.

Figure 7:
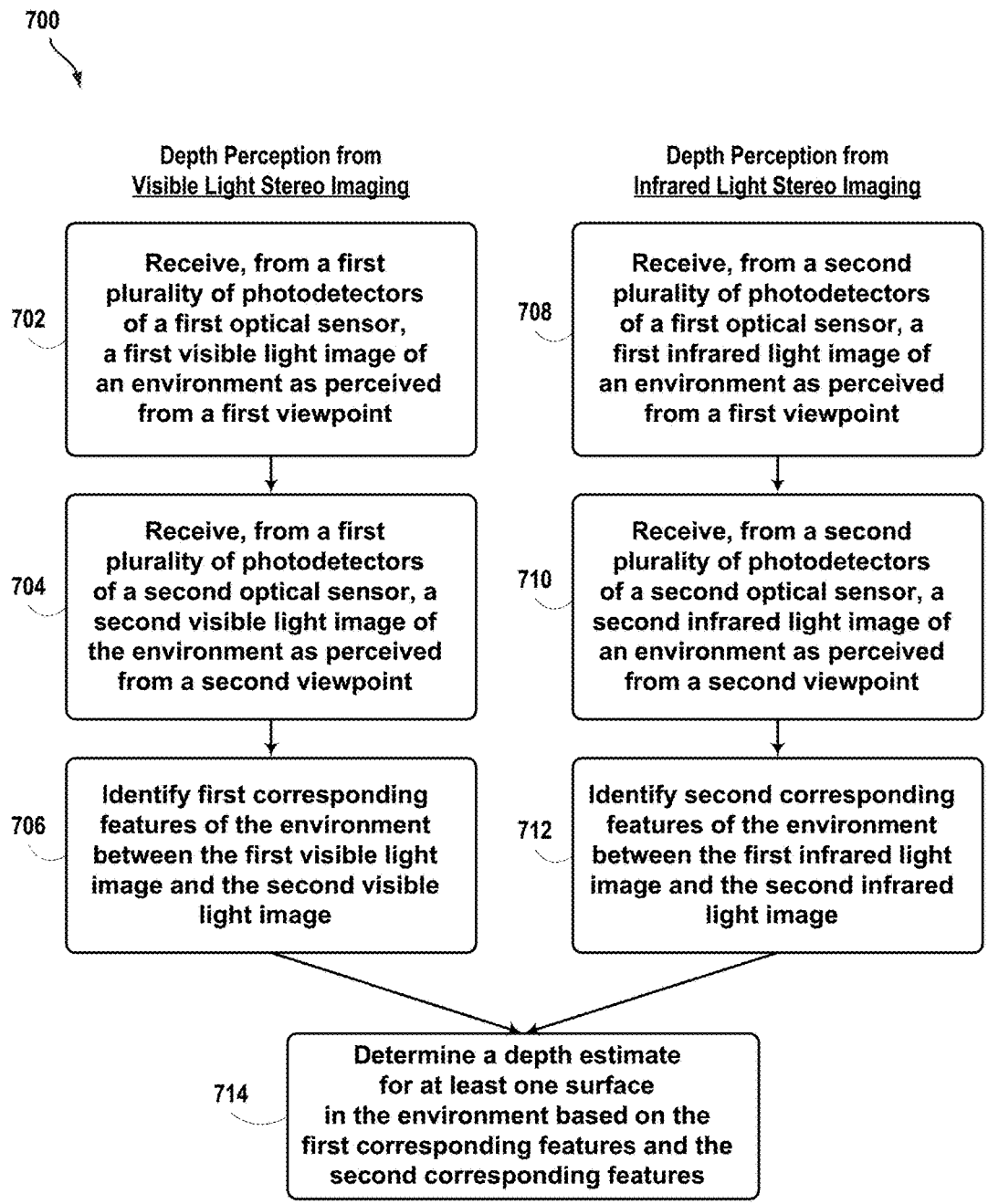
FIG. 7 is a block diagram of example functions that may be performed by a computing device, according to an example embodiment.

FIG. 7 is a block diagram of an example method 700 for determining a virtual representation of an environment. Method 700 shown in FIG. 7 presents an embodiment of a method that could be used or implemented by the robotic device 200 of FIG. 2B, for example, or more generally by one or more components of any computing device. Method 700 may include one or more operations, functions, or actions as illustrated by one or more of blocks 702-714. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 700 and other processes and methods disclosed herein, each block in FIG. 7 may represent circuitry that is wired to perform the specific logical functions in the process.

In one embodiment, functions of the method 700 may be performed by a control system, such as 700 control system 240 of FIG. 2B. In other embodiments, the functions of the method 700 may be distributed across multiple control systems that are configured to use an output of stereo image processing to determine the depths of surfaces in an environment.

Blocks 702, 704, and 706 are associated with depth perception from visible light images. Blocks 708, 710, and 712 are associated with depth perception from infrared light images. Although these two groups of blocks are depicted as being performed in parallel, each of the blocks 702-714 of method 700 shown in FIG. 7 may be performed in any order. The arrangement of the operations of method 700 is intended to facilitate understanding of the method 700, and should not be misconstrued as limiting the order in which the operations of blocks 702-714 may be performed.

At block 702, the method 700 involves receiving, from a first plurality of photodetectors of a first optical sensor, a first visible light image of an environment as perceived from a first viewpoint. The first optical sensor may include a combination of visible-sensing photodetectors and infrared-sensing photodetectors, similarly to the optical sensor 402 described above with respect to FIG. 4. The photodetectors may be arranged in a variety of ways, such as the checkerboard pattern as described with respect to FIG. 5, among other possible arrangements. The first optical sensor may also be similar to the first optical sensor 604 shown in FIG. 6.

Light within the visible spectrum may cause the first plurality of photodetectors to generate a charge. The charge generated by a particular photodetector may be proportional to the intensity or luminance of light incident on that particular photodetector. The first optical sensor may include control circuitry configured to read the charges generated by the first plurality of photodetectors and, based on those charges, generate an image. In some embodiments, the image is panchromatic (e.g. grayscale) within the human-visible wavelength spectrum. In other embodiments, the first plurality of photodetectors includes photodetectors that separately capture red, green, and blue visible light, and the control circuitry may be configured to combine (e.g. demosaic) those charges to form a color image.

At block 704, the method 700 involves receiving, from a first plurality of photodetectors of a second optical sensor, a second visible light image of the environment as perceived from a second viewpoint. The first optical sensor may be positioned a known distance from the second optical sensor. In some embodiments, the relative angles of the first and second optical sensors are also known. A computing device may use the respective distance and angles between the first and second optical sensors to estimate the depth of at least one surface in the environment.

At block 706, the method 700 involves identifying first corresponding features of the environment between the first visible light image and the second visible light image. The environment may have therein a number of objects that form surfaces within the environment. Those objects may have certain visually-recognizable features—such as edges, changes in color, and contours, among other possible features—that can be commonly recognized in both the first and second visible light images. A computing device may identify a given feature of the environment and determine a first pixel location of that feature within the first visible light image and a second pixel location of that feature within the second visible light images. Based on difference between the first and second pixel location and the relative positions of the first and second optical sensors, the depth of that feature (e.g. the distance between the optical sensors and the feature) may be determined using triangulation and/or stereo image processing. Such feature depth determinations may be repeated for any number of identified features within the environment.

At block 708, the method 700 involves receiving, from a second plurality of photodetectors of a first optical sensor, a first infrared light image of an environment as perceived from a first viewpoint. The infrared light described in the method 700 may be light within a particular band of infrared light (e.g. 825 nm to 875 nm, among other possible IR bands). The first infrared light image of the environment may capture residual infrared light within that particular band from various light sources. In some embodiments, the first infrared light image may also capture an infrared pattern projected onto the environment by a texture projector.

At block 710, the method 700 involves receiving, from a second plurality of photodetectors of a second optical sensor, a second infrared light image of an environment as perceived from a second viewpoint. Like the first infrared light image, the second infrared light image may capture an infrared pattern projected onto the environment by a texture projector.

At block 712, the method 700 involves identifying second corresponding features of the environment between the first infrared light image and the second infrared light image. Residual infrared light within the particular infrared band might provide adequate illumination to detect certain features of objects or surfaces within the environment. Additionally, an infrared pattern projected onto the environment produces detectable features on otherwise dimly-lit or featureless surfaces in the environment. As described with respect to block 706, a computing device may identify features (naturally existing and/or artificially projected feature) in the environment, determine the relative pixel locations of those identified features between the two infrared light images, and determine the depths of those features using triangulation and/or stereo image processing.

At block 714, the method 700 involves determining a depth estimate for at least one surface in the environment based on the first corresponding features and the second corresponding features. In the context of a single surface, a computing device may determine a first depth estimate for that surface based on the first corresponding features and a second depth estimate for that surface based on the second corresponding features. The computing device may employ stereo image processing and/or triangulation techniques in order to determine the first and second depth estimates. In some embodiments, the computing device may determine a combined depth estimate by averaging the first and second depth estimates.

A particular feature of a given surface may only be identified in either the visible light images or the infrared light images. In such cases, determining the depth estimate may involve determining the depth estimate based on the pair of images from which that particular feature may be identified.

In the context of the whole environment (or a portion of the environment containing multiple surfaces), a computing device may generate a visible light-based depth map for various surfaces in the environment based on identified corresponding features between the visible light images and an infrared light-based depth map for various surfaces in the environment based on identified corresponding features between the infrared light images. The visible light-based depth map may lack depth information for dimly-lit portions of the environment, while the infrared light-based depth map may lack depth information for brightly-lit portions of the environment. In some implementations, the computing device may determine a combined depth map by selecting one of the two depth maps as a "base" depth map, then including depth information missing from the selected depth map from the other depth map.

In other implementations, the computing device may determine a combined depth map by including unique depth information from either depth map and, where depth information for a given surface exists in both depth maps, averaging the depth information from both depth maps for that given surface. For example, the computing device may determine which depth information is unique to the visible light-based depth map, which depth information is unique to the infrared light-based depth map, and which depth information exists in both depth maps. First, the computing device may stitch or otherwise join together the unique depth information from each depth map. Then, the computing device may average the depth information for surfaces whose depths are present in both depth maps and stitch or otherwise combine that averaged depth information with the unique depth information to form a combined depth map.

Note that "depth map" and "depth image" may refer to spatial depth information of surfaces in an environment. Example representations of depth maps are depicted in FIG. 11B and FIG. 11D below.

In some instances, the computing device may repeat one or more blocks of the method 700 to determine multiple depth estimates for an environment. For example, the computing device may use the method 700 to determine a depth map that indicates the depth to one or more surfaces in the environment.

Figure 8A:
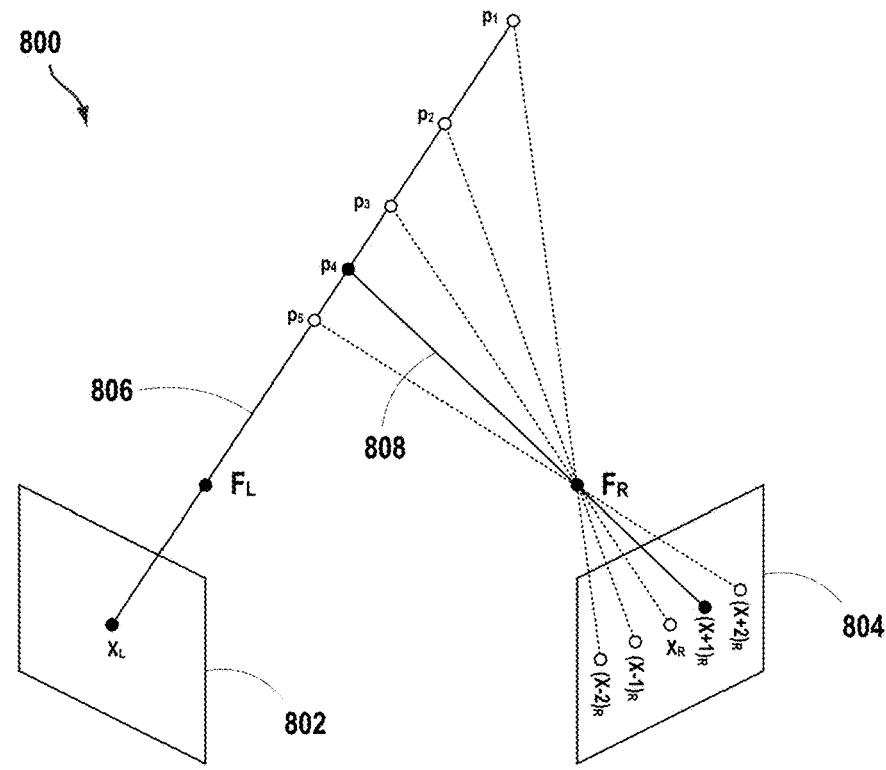
FIG. 8A is a conceptual illustration of an example configuration for determining a correlation surface, according to an example embodiment.
Figure 8B:
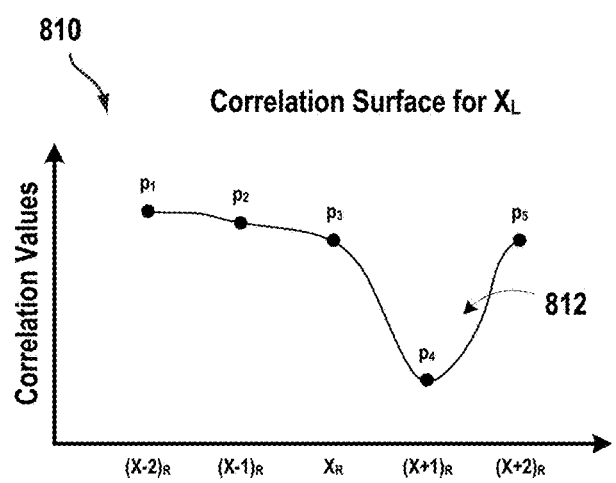
FIG. 8B is an example illustration of a correlation surface, according to an example embodiment.
Figure 8C:
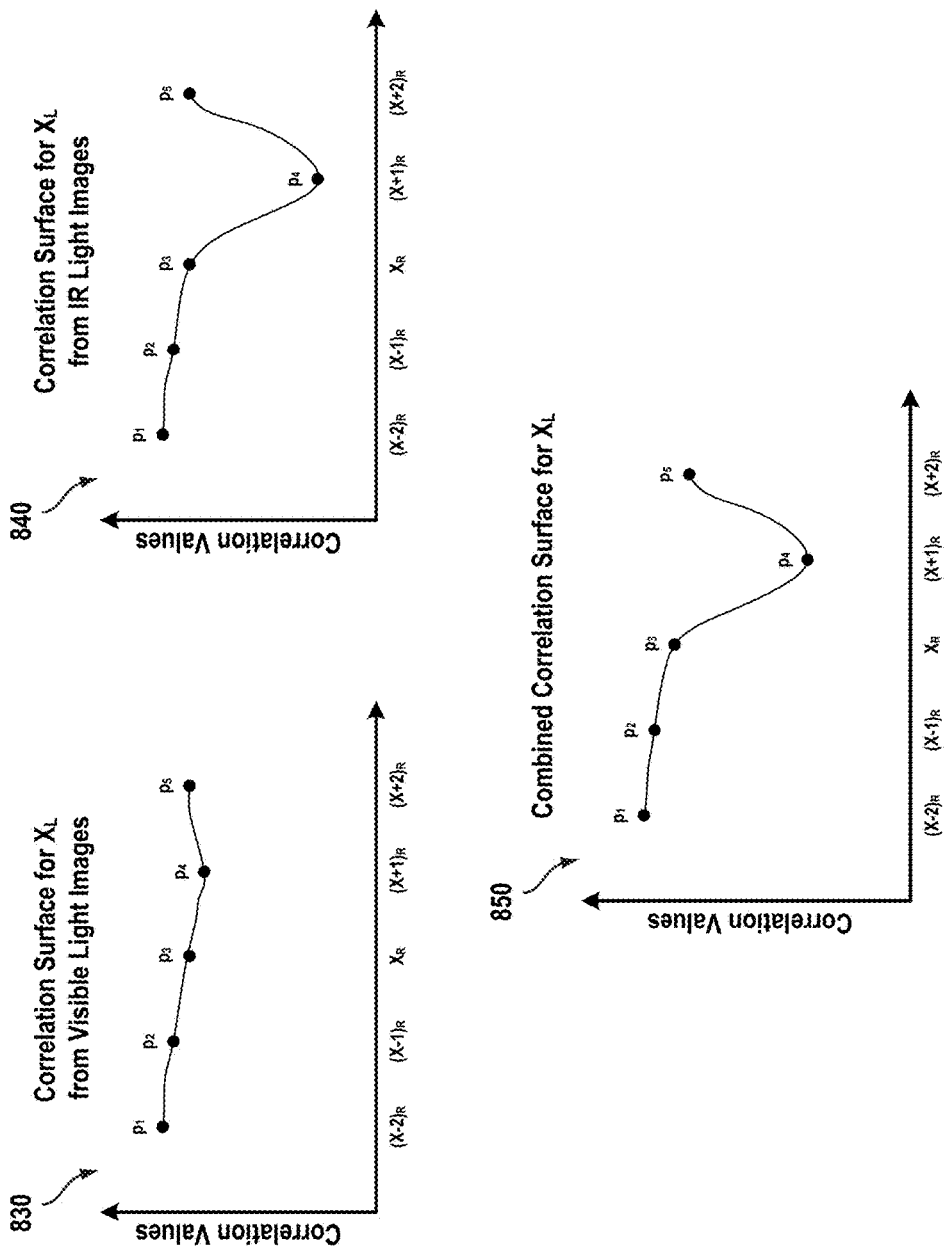
FIG. 8C is an example illustration of combining correlation surfaces, according to an example embodiment.

In various embodiments, determining a depth map or depth image may involve identifying a feature from an image from one perspective and locating that same feature within another image from a different perspective. The relative pixel location of that feature between the two images may be used as a basis for determining the depth (e.g. distance from the optical sensor) by triangulation. In various implementations, the identifying these corresponding features may involve determining one or more correlation surfaces. A "correlation surface" as described herein refers to a combination of numerical estimations indicative of an extent of similarity between a pixel and its neighborhood (e.g. other pixels adjacent or otherwise nearby that pixel) within one image and two or more pixels (e.g. pixels and their neighborhoods) within a different image. FIG. 8A, FIG. 8B, and FIG. 8C illustrate the manner in which correlation surfaces may be used in various implementations in the identification of corresponding features between two images. In various instances, when determining a correlation surface, a given pixel (such as pixel $X_L$) and its "neighborhood" in the left image may be compared to one or more pixels in the right image. Considering the neighborhood surrounding a given pixel $X_L$ when determining a correlation surface may be performed in the present example. Additionally, it should be understood that the process may be flipped, such that a pixel in the right image may be compared to two or more pixels in the left image.

FIG. 8A is a conceptual illustration 800 of an example configuration for determining a correlation surface, according to an example embodiment. The configuration includes a left optical sensor 802 and a right optical sensor 804 arranged to provide different viewpoints of an environment. The following example discussed with respect to FIG. 8A, FIG. 8B, and FIG. 8C describe a process by which a correlation surface can be determined for pixel $X_L$. Pixel $X_L$ of an image captured by the left optical sensor 802 may be a pixel within the left viewpoint image having an x-value and y-value coordinate position within the image.

When determining the correlation surface for pixel $X_L$, a computing device may compare aspects of the pixel $X_L$ (e.g. brightness, luminosity, color, etc.) in the left image to aspects of one or more pixels in the right image, such as pixels $X_R$, $(X+1)_R$, $(X+2)_R$, $(X-1)_R$, and $(X-2)_R$. The computing device may determine an extent of similarity between the left pixel $X_L$ and one or more of those right image pixels. The numerical value representing the extent of similarity between two pixels may be referred to herein as a "correlation value," such that a set of correlation values serve as the basis of a correlation surface. In the present example, smaller correlation values are indicative of a higher degree of similarity between two pixels, whereas larger correlation values are indicative of a lesser degree of similarity between two pixels. Thus, any "dips," "valleys," or localized minima may be interpreted as two pixels having the highest relative degree of similarity compared to the other surrounding pixels, which in some cases may signify a "match" (e.g. corresponding features).

As an example operation, a computing device determines the correlation surface for $X_L$ by first comparing pixel $X_L$ to each of the pixels $X_R$, $(X+1)_R$, $(X+2)_R$, $(X-1)_R$, and $(X-2)_R$. The correlation surface 810 may be generated after performing those comparisons. As shown in FIG. 8B, the correlation surface 810 contains a localized minimum at point $p_4$ corresponding to pixel $(X+1)_R$, as indicated by the "valley" 812 in the correlation surface 810. In this example, the computing system may thus determine that the feature in $X_L$ corresponds to the feature in $(X+1)_R$. Upon identifying the relative pixel locations for the corresponding feature, the computing device may use triangulation to determine the depth of the feature in $X_L$ as being equal to the distance from the left optical sensor 802 to point $p_4$. Such a triangulation technique may involve determining an intersection point of projection line 806 of $X_L$ and a projection line 808 of $(X+1)_R$. The projection line 806 for $X_L$ may be determined based on focal point $F_L$ of the left optical sensor and the projection line 808 for $(X+1)_R$ may be determined based on focal point $F_R$ of the right optical sensor.

Note that, in this example, as the "x" pixel on the right image increases (e.g. "x" pixels that are further to the right), the depth of the corresponding point p decreases; conversely, as the "x" pixel on the right image decreases (e.g. "x" pixels that are further to the left), the depth of the corresponding point p increases. Thus, after identifying the relative pixel locations of corresponding features from the correlation surface, a computing device may also estimate the depth of that feature.

Also note that the example described above with respect to FIG. 8A and FIG. 8B discusses a process of calculating a correlation surface for left image pixel $X_L$ to a set of right image pixels that are horizontally adjacent to each other. However, various embodiments may involve calculating a correlation surface by comparing the left image pixel $X_L$ to a set of right image pixels that are vertically adjacent to each other, a set of right image pixels that make up a two-dimensional array of pixels, or a set of right image pixels that are within a predetermined radius of a given right image pixel, among other possible sets of right image pixels. The manner in which the correlation surface is determined for a given left image pixel may depend upon a variety of factors, including the relative positions of the two optical sensors in a given system or the processing speed of a computing device used to determine the correlation system, among other possible factors.

The correlation surface as described herein may refer to a collection of discrete correlation values. Any curve-fitting or continuous representations of the correlation surface are provided for explanatory purposes; various embodiments may or may not determine a functional expression (e.g. a polynomial equation or other interpolated function).

In some embodiments, multiple correlation surfaces may be determined corresponding to images captured from different wavelengths of light. For example, two optical sensors may capture a pair of visible light images and a pair of infrared light images. In an example process, a computing device may determine one correlation surface from the pair of visible light images, and another correlation surface from the pair of infrared light images. Then, the computing device may combine the two correlation surfaces to determine a combined correlation surface. An example illustration of this example process is shown in FIG. 8C.

In an example scenario, a feature may only be detectable within one wavelength band of light. For example, certain features of surfaces in dark portions of an environment may be too dark for a visible light image to determine distinguishable features therefrom. However, an infrared light projector may illuminate the otherwise dark surface and allow features to be detected in an infrared light spectrum.

In FIG. 8C, the correlation surface 830 for pixel $X_L$ determined from visible light images does not contain any dips, valleys, or localized minima. However, the correlation surface 840 for pixel $X_L$ determined from infrared light images has a localized minimum at point $p_4$. A computing device may add correlation surface 830 and correlation surface 840 to determine a combined correlation surface 850. By adding the corresponding p values between the two correlation surfaces 830 and 840, the localized minima is maintained in correlation surface 850. Thus, by simply adding two correlation surfaces together that were each determined from different light wavelengths, the resulting combined correlation surface 850 may preserve the local minima from both of the separate correlation surfaces. Then, the computing device may identify these local minima from the combined correlation surface 850, identify which of those localized minima represent corresponding features with a given pixel value, and determine the depth of the feature in that given pixel value as described above.

Identifying localized minima may be achieved using a variety of techniques. In some implementations, a computing device may determine if a correlation value in a given correlation surface is less than a threshold correlation value. In other implementations, a computing device may determine if the smallest correlation value in a given correlation surface is less than the next smallest correlation value. A variety of other techniques may be used to identify a localized minimum in a correlation surface.

Figure 9:
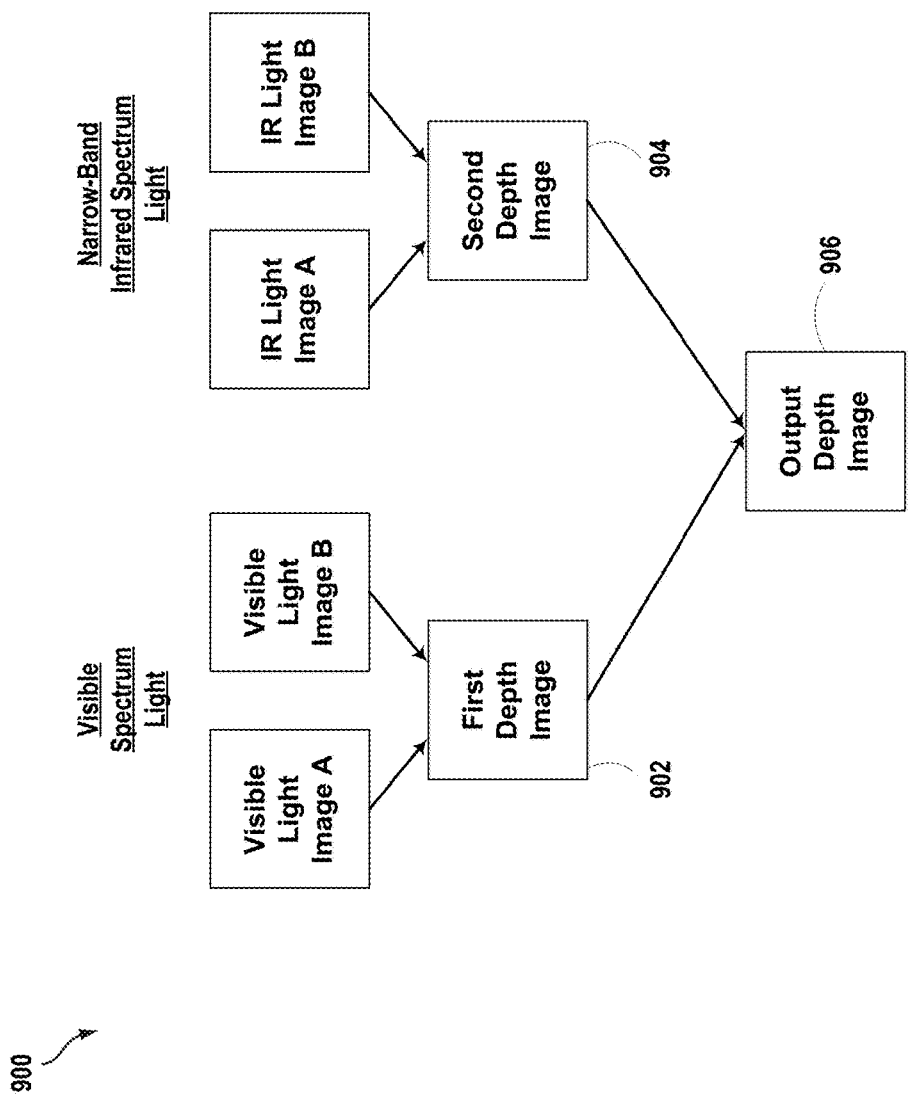
FIG. 9 is a conceptual illustration of combining information from multiple depth images, according to an example embodiment.

FIG. 9 is a conceptual illustration 900 of combining information from multiple depth images to form a combined output depth image. A computing device may employ stereo image processing on visible light image A and visible light image B to determine a first depth image 902. The first depth image may be a mapping of distances from one or more optical sensors to at least one surface in an environment. The computing device may also employ stereo image processing on IR light image A and IR light image B to determine a second depth image 904. Like the first depth image, the second depth image may be a mapping of distances from one or more optical sensors to at least one surface in the environment. The computing device may combine the first depth image 902 and the second depth image 904 in order to determine the output depth image 906.

FIG. 10A is a conceptual illustration 1000 of an example environment, according to an example embodiment. The example environment includes wall 1008 and box 1010 positioned in front of the wall with respect to texture projector 1002. Texture projector 1002 may be placed at a distance from the wall 1008 and box 1010, and configured to project an infrared projected pattern, similarly to or the same as texture projector 602 as described with respect to FIG. 6. Additionally, a first optical sensor 1004 and a second optical sensor 1006 may be present and capture both visible light images and infrared light images of the example environment. The texture projector 1002, first optical sensor 1004, and second optical sensor 1006 may be configured in a similar manner as the texture projector 602, first optical sensor 604, and second optical sensor 606 as described with respect to FIG. 6.

The example environment shown in FIG. 10A is partially lit by a bright light source, such that the environment has a bright area 1014 (illustrated using a dotted pattern) and a dark area 1012. The bright area 1014 may be illuminated by an artificial light source (e.g. a light bulb) and/or by sunlight. The dark area 1012 may be produced by a shadow cast from an object onto the environment, or be a result of a lack of a light source illuminating that portion of the environment. Both the wall 1008 and the box 1010 include dark and bright portions, as illustrated in FIG. 10A. The texture projector 1002 may project the pattern onto the entire environment; however, an optical sensor may only perceive the infrared projected pattern on the dark area 1012. Thus, the dark area 1012 is depicted having the infrared pattern projected thereon.

During operation, the optical sensors 1004 and 1006 capture both visible light images and infrared light images from different viewpoints. The process of determining depth information from these captured images is depicted in FIG. 10B and described below.

Note that the illustration 1000 depicts bright area using dots and the dark area as having a visibly perceivable projected pattern. These illustrated patterns are provided for explanatory purposes and do not necessarily correspond to an optical sensor's perception or a human eye's perception of the environment. Also note that, although the boundary between the dark area 1012 and the bright area 1014 is distinct in the illustration 1000 of FIG. 10A, the boundary between dark and bright areas in other environments may be more of a gradient.

Figure 10B:
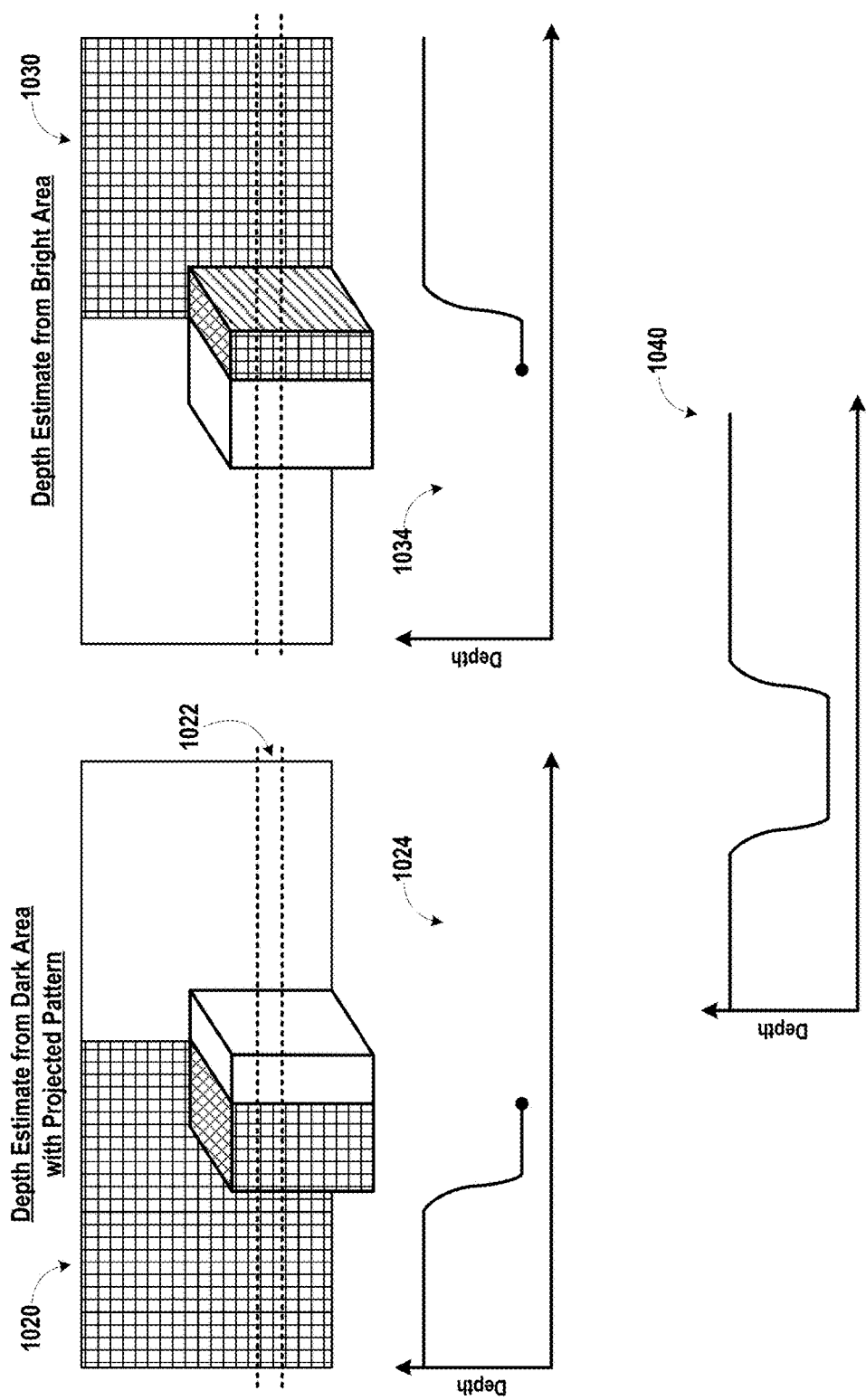
FIG. 10B is an example illustration of determining depth from multiple depth images, according to an example embodiment.

FIG. 10B is an example illustration of determining depth from multiple depth images. The left side of FIG. 10B depicts determining a depth estimate from the dark area illuminated by the infrared projected pattern. The shaded area on the illustration 1020 of the environment represents the portion of the environment on which the projected pattern can be detected by infrared light images and used to determine the depths of the surfaces in the environment. For the purposes of explanation, estimating the depth of the surfaces across horizontal section 1022 is discussed. Using structured-light processing, a computing device may determine depth information from the infrared light images of the dark area of the environment illuminated by the infrared projected pattern. The resulting depth estimate is depicted in graph 1024. Moving left to right, the depth of the far wall is detected, and then the depth decreases as the box is detected until the dark area stops (represented by the dot). Note that, in this example, no depth information is determined for the bright area based on the infrared light images; this is because the bright light overcame the infrared projected pattern, thereby making the discernment of features on the bright area difficult.

The right side of FIG. 10B depicts determining a depth estimate from the bright area. The shaded area on the illustration 1030 of the environment represents the portion of the environment illuminated by the bright light, which allows for visual detection of features from the visible light images and used to determine depths of the surfaces in the environment. Using stereo image processing, a computing device may determine depth information from the visible light images of the bright area of the environment. The resulting depth estimate is depicted in graph 1034. Moving left to right, no depth information is determined along the dark area until the bright area is reached. This is because, in the visible light spectrum, the dark area does not provide sufficient light to discern features used to sense depth. At that boundary between the bright and dark area (represented by the dot in graph 1034), the depth of the box is detected, and then the depth of the wall.

Graph 1040 depicts the combined depth estimate from the depth estimates shown in graph 1024 and graph 1034. Although the environment had a wide luminance range, employing the depth sensing techniques of the present application produced a depth estimate of both the bright and dark areas of the environment. As illustrated in FIGS. 10A and 9B, a given surface might have both bright and dark portions that, using typical stereo imaging techniques, would provide insufficient or inaccurate depth information about that surface. However, by detecting light in the environment in the visible spectrum and a projected pattern onto the environment within a particular infrared band, comprehensive and accurate depth information of surfaces in the environment may be detected. The techniques of the present application may provide improved depth sensing in sunlit environments, darker indoor environments, and a combination of light and dark environments.

Figure 11A:
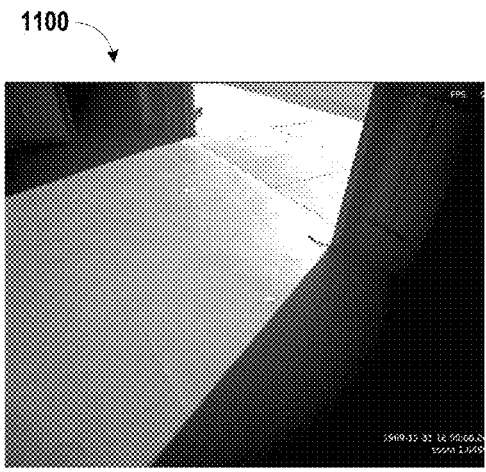
FIG. 11A is an example image of a scene, according to an example embodiment.
Figure 11B:
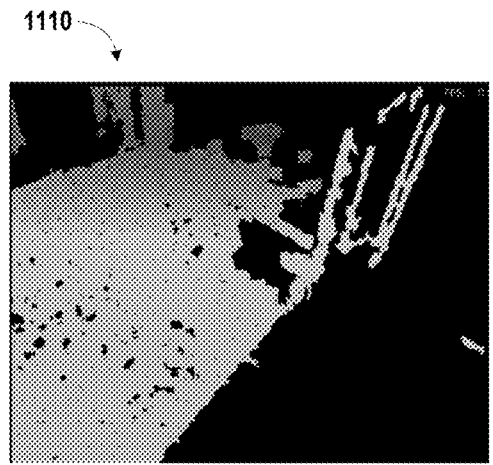
FIG. 11B is an example depth image of the scene shown in FIG. 11A, according to an example embodiment.

FIG. 11A is an example image 1100 of a scene, according to an example embodiment. The scene shown in FIG. 11A includes an opened garage or bay door through which sunlight illuminates a portion of the ground. Other portions of the ground and interior walls are dimly lit in comparison to the luminance of the sunlight. Typical stereo image processing might produce a depth map 1110 of the scene as shown in FIG. 11B. In FIG. 11B, black portions of the environment indicate a lack of depth information, while the white or gray portions of the environment indicate that determined depth information (where light gray indicates a smaller depth and dark gray indicates greater depth). As shown in FIG. 11B, depth information could not be determined for most of the shadowed portions of the scene.

Figure 11C:
FIG. 11C is an example image of a scene with a projected pattern, according to an example embodiment.
Figure 11D:
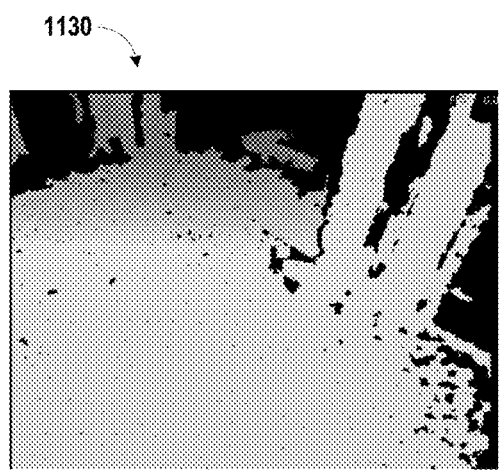
FIG. 11D is an example depth image of the scene shown in FIG. 11C, according to an example embodiment.

FIG. 11C is an example image 1120 of the scene with a projected pattern, according to an example embodiment. The image 1120 shows both the sunlight illuminating the ground and a projected pattern illuminating the shadowed portions of the environment. Note that image 1120 may represent a broad range of light wavelengths, and may simultaneously depict captured visible light and/or infrared light for the purposes of explanation. By performing the combined infrared and visible light depth sensing of the present application, a computing device may generate depth map 1130 of the scene as shown in FIG. 11D. Unlike the depth map 1110 shown in FIG. 11B, the depth map 1130 shown in FIG. 11D includes depth information from the shadowed portion of the scene (which may have been derived from infrared light images using structured-light processing). Compared to depth map 1110, depth map 1130 determined from the combined visible light and infrared light depth sensing provides a more comprehensive depth information.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense. Further, it is intended to be understood that the following further describe aspects of the present description.

What is claimed is:

1. An optical sensor comprising:
    a planar array of photodetectors comprising a first plurality of photodetectors and a second plurality of photodetectors, wherein each photodetector is configured to generate a charge based on an intensity of light incident on the photodetector;
    a light filter array coupled to the planar array of photodetectors comprising a first plurality of filters configured to pass visible light onto the first plurality of photodetectors and a second plurality of filters configured to pass infrared light within a particular infrared band onto the second plurality of photodetectors, wherein filters of the first plurality of filters are interspersed with filters of the second plurality of filters to form a plurality of mosaics, wherein each mosaic includes two filters of the first plurality of filters and two filters of the second plurality of filters arranged in a checkerboard configuration; and
    a control circuit configured to:
        generate a visible light image based on charges from the first plurality of photodetectors, wherein each pixel in the visible light image represents an average of charges generated by two photodetectors of the first plurality of photodetectors in a respective mosaic of the plurality of mosaics; and
        generate an infrared light image based on charges from the second plurality of photodetectors, wherein each pixel in the infrared light image represents an average of charges generated by two photodetectors of the second plurality of photodetectors in a respective mosaic of the plurality of mosaics, and wherein the visible light image is separate from the infrared light image.

2. The optical sensor of claim 1, wherein the control circuit is further configured to:
    cause, over a first duration of time, the first plurality of photodetectors to capture visible light to generate the charges that the visible light image is based on; and
    cause, over a second duration of time, the second plurality of photodetectors to capture infrared light to generate the charges that the infrared light image is based on,
    wherein the second duration of time is greater than the first duration of time.

3. The optical sensor of claim 1, wherein the control circuit is further configured to:
    amplify the charges generated by the first plurality of photodetectors by a first gain value; and
    amplify the charges generated by the second plurality of photodetectors by a second gain value, wherein the second gain value is greater than the first gain value.

4. The optical sensor of claim 1, wherein the control circuit is further configured to transmit the visible light image and the infrared light image to one or more devices.

5. A system comprising:
- a planar array of photodetectors comprising a first plurality of photodetectors configured to capture visible light and a second plurality of photodetectors configured to capture infrared light within a particular infrared band, wherein each photodetector is configured to generate a charge based on an intensity of light incident on the photodetector, and wherein the first plurality of photodetectors and the second plurality of photodetectors alternate along both rows and columns to form a checkerboard pattern;
- a light filter array coupled to the planar array of photodetectors comprising a first plurality of filters configured to pass visible light onto the first plurality of photodetectors and a second plurality of filters configured to pass infrared light within a particular infrared band onto the second plurality of photodetectors, wherein the planar array of photodetectors and the light filter array are arranged to form a plurality of mosaics, wherein each mosaic includes two filters of the first plurality of filters and two filters of the second plurality of filters arranged according to the checkerboard pattern; and
- a computing device configured to:
  - generate a visible light image based on charges from the first plurality of photodetectors, wherein each pixel in the visible light image represents an average of charges generated by two photodetectors of the first plurality of photodetectors in a respective mosaic of the plurality of mosaics; and
  - generate an infrared light image based on charges from the second plurality of photodetectors, wherein each pixel in the infrared light image represents an average of charges generated by two photodetectors of the second plurality of photodetectors in a respective mosaic of the plurality of mosaics, and wherein the visible light image is separate from the infrared light image.

6. The system of claim 5, wherein the computing device is further configured to:
- cause, over a first duration of time, the first plurality of photodetectors to capture visible light to generate the charges that the visible light image is based on; and
- cause, over a second duration of time, the second plurality of photodetectors to capture infrared light to generate the charges that the infrared light image is based on,
- wherein the second duration of time is greater than the first duration of time.

7. The system of claim 5, wherein the computing device is further configured to:
- amplify the charges generated by the first plurality of photodetectors by a first gain value; and
- amplify the charges generated by the second plurality of photodetectors by a second gain value, wherein the second gain value is greater than the first gain value.

8. A method comprising:
- receiving, at a computing system, a first set of charges generated based on respective intensities of light incident on a first plurality of photodetectors;
- based on the first set of charges, generating a visible light image;
- receiving, at the computing system, a second set of charges generated based on respective intensities of light incident on a second plurality of photodetectors, wherein the first plurality of photodetectors and the second plurality of photodetectors alternate along both rows and columns to form a checkerboard pattern arranged into a plurality of mosaics, wherein each mosaic includes two photodetectors of the first plurality of photodetectors and two photodetectors of the second plurality of photodetectors arranged according to the checkerboard pattern; and
- based on the second set of charges, generating an infrared light image,
- wherein each pixel in the visible light image represents an average of charges generated by two photodetectors of the first plurality of photodetectors in a respective mosaic of the plurality of mosaics,
- wherein each pixel in the infrared light image represents an average of charges generated by two photodetectors of the second plurality of photodetectors in a respective mosaic of the plurality of mosaics, and wherein the visible light image is separate from the infrared light image.

9. The method of claim 8, further comprising:
- causing, over a first duration of time, the first plurality of photodetectors to capture visible light to generate the first set of charges; and
- causing, over a second duration of time, the second plurality of photodetectors to capture infrared light to generate the second set of charges, wherein the second duration of time is greater than the first duration of time.

10. The method of claim 8, further comprising:
- amplifying the first set of charges generated by the first plurality of photodetectors by a first gain value; and
- amplifying the second set of charges generated by the second plurality of photodetectors by a second gain value, wherein the second gain value is greater than the first gain value.

11. The method of claim 8, wherein the first set of charges and the second set of charges are received simultaneously.

12. The method of claim 8, wherein the first set of charges are received at a first time and the second set of charges are received at a second time, wherein the second time is subsequent to the first time.

* * * * *